(12) United States Patent
Giller et al.

(10) Patent No.: US 8,506,862 B2
(45) Date of Patent: Aug. 13, 2013

(54) THREE DIMENSIONAL PRINTING MATERIAL SYSTEM AND METHOD USING PLASTICIZER-ASSISTED SINTERING

(75) Inventors: Eugene Giller, Needham, MA (US); Derek X. Williams, Berwick, ME (US)

(73) Assignee: 3D Systems, Inc., Rock Hill, SC (US)

( * ) Notice: Subject to any disclaimer, the term of this patent is extended or adjusted under 35 U.S.C. 154(b) by 0 days.

(21) Appl. No.: 13/019,729

(22) Filed: Feb. 2, 2011

(65) Prior Publication Data

US 2011/0156301 A1 Jun. 30, 2011

Related U.S. Application Data

(62) Division of application No. 12/035,743, filed on Feb. 22, 2008.

(60) Provisional application No. 60/902,782, filed on Feb. 22, 2007.

(51) Int. Cl.
*D04H 1/64* (2012.01)
*C08K 5/05* (2006.01)

(52) U.S. Cl.
USPC .......................................... 264/128; 524/385

(58) Field of Classification Search
USPC ...................................... 524/8, 385; 264/128
See application file for complete search history.

(56) References Cited

U.S. PATENT DOCUMENTS

| | | | |
|---|---|---|---|
| 2,156,242 A | 4/1939 | Kharasch et al. | |
| 2,296,636 A | 9/1942 | Hanahan | |
| 2,522,548 A | 9/1950 | Streicher | |
| 2,662,024 A | 12/1953 | Riddell et al. | |
| 3,297,601 A | 1/1967 | Maynard et al. | |
| 3,303,147 A | 2/1967 | Elden | |
| 3,309,328 A | 3/1967 | Carroll et al. | |
| 3,476,190 A | 11/1969 | Jenny et al. | |
| 3,525,632 A | 8/1970 | Enoch | |
| 3,642,683 A | 2/1972 | Fry et al. | |
| 3,821,006 A | 6/1974 | Schwartz | |
| 3,835,074 A | 9/1974 | Desmarais | |
| 3,852,083 A | 12/1974 | Yang | |
| 3,870,538 A | 3/1975 | Burkard et al. | |
| 3,890,305 A | 6/1975 | Weber et al. | |
| 3,926,870 A | 12/1975 | Keegan et al. | |
| 3,930,872 A | 1/1976 | Toeniskoetter et al. | |
| 3,932,923 A | 1/1976 | DiMatteo | |

(Continued)

FOREIGN PATENT DOCUMENTS

| | | |
|---|---|---|
| CN | 1810492 | 8/2006 |
| CN | 1857930 | 11/2006 |

(Continued)

OTHER PUBLICATIONS

Adamson, *Physical Chemistry of Surfaces*, Interscience Publishers, Inc. (1967).

(Continued)

*Primary Examiner* — John Uselding

(57) ABSTRACT

A materials system, kit, and methods are provided to enable the formation of articles by three dimensional printing. A method includes providing a particulate material comprising a plurality of adjacent particles, the particulate material including an aqueous-insoluble thermoplastic; applying to at least some of the plurality of particles an aqueous fluid binder in an amount sufficient to bond those particles together to define an intermediate article; and immersing the intermediate article in a liquid infiltrant medium to define a final article.

15 Claims, 12 Drawing Sheets

(56) References Cited

U.S. PATENT DOCUMENTS

| | | |
|---|---|---|
| 4,041,476 A | 8/1977 | Swainson |
| 4,042,408 A | 8/1977 | Murray et al. |
| 4,078,229 A | 3/1978 | Swanson et al. |
| 4,247,508 A | 1/1981 | Housholder |
| 4,288,861 A | 9/1981 | Swainson et al. |
| 4,303,556 A | 12/1981 | Llendado |
| 4,310,996 A | 1/1982 | Mulvey et al. |
| 4,327,156 A | 4/1982 | Dillon et al. |
| 4,369,025 A | 1/1983 | von der Weid |
| 4,443,392 A | 4/1984 | Becker et al. |
| 4,444,594 A | 4/1984 | Paddison et al. |
| 4,476,190 A | 10/1984 | Clarke et al. |
| 4,575,330 A | 3/1986 | Hull |
| 4,613,627 A | 9/1986 | Sherman et al. |
| 4,618,390 A | 10/1986 | Powell |
| 4,649,077 A | 3/1987 | Lauchenauer et al. |
| 4,665,492 A | 5/1987 | Masters |
| 4,752,352 A | 6/1988 | Feygin |
| 4,752,498 A | 6/1988 | Fudim |
| 4,755,227 A | 7/1988 | Sherif et al. |
| 4,758,278 A | 7/1988 | Tomic |
| 4,801,477 A | 1/1989 | Fudim |
| 4,844,144 A | 7/1989 | Murphy et al. |
| 4,863,538 A | 9/1989 | Deckard |
| 4,929,402 A | 5/1990 | Hull |
| 4,938,816 A | 7/1990 | Beaman et al. |
| 4,940,412 A | 7/1990 | Blumenthal |
| 4,942,001 A | 7/1990 | Murphy et al. |
| 4,942,003 A | 7/1990 | Bold et al. |
| 4,942,060 A | 7/1990 | Grossa et al. |
| 4,943,928 A | 7/1990 | Campbell et al. |
| 4,944,817 A | 7/1990 | Bourell et al. |
| 4,945,032 A | 7/1990 | Murphy et al. |
| 4,961,154 A | 10/1990 | Pomerantz et al. |
| 4,996,010 A | 2/1991 | Modrek |
| 4,996,282 A | 2/1991 | Noren et al. |
| 4,999,143 A | 3/1991 | Hull et al. |
| 5,009,585 A | 4/1991 | Hirano et al. |
| 5,011,635 A | 4/1991 | Murphy et al. |
| 5,015,312 A | 5/1991 | Kinzie |
| 5,015,424 A | 5/1991 | Smalley |
| 5,017,317 A | 5/1991 | Marcus |
| 5,017,753 A | 5/1991 | Deckard |
| 5,031,120 A | 7/1991 | Pomerantz et al. |
| 5,038,014 A | 8/1991 | Pratt et al. |
| 5,040,005 A | 8/1991 | Davidson et al. |
| 5,051,334 A | 9/1991 | Fan |
| 5,053,090 A | 10/1991 | Beaman et al. |
| 5,058,988 A | 10/1991 | Spence |
| 5,059,021 A | 10/1991 | Spence et al. |
| 5,059,266 A | 10/1991 | Yamane et al. |
| 5,059,359 A | 10/1991 | Hull et al. |
| 5,071,337 A | 12/1991 | Heller et al. |
| 5,071,503 A | 12/1991 | Berman et al. |
| 5,076,869 A | 12/1991 | Bourell et al. |
| 5,076,974 A | 12/1991 | Modrek et al. |
| 5,088,047 A | 2/1992 | Bynum |
| 5,089,184 A | 2/1992 | Hirano et al. |
| 5,089,185 A | 2/1992 | Hirano et al. |
| 5,094,935 A | 3/1992 | Vassiliou et al. |
| 5,096,491 A | 3/1992 | Nagai et al. |
| 5,096,530 A | 3/1992 | Cohen |
| 5,104,592 A | 4/1992 | Hull et al. |
| 5,106,288 A | 4/1992 | Hughes et al. |
| 5,107,395 A | 4/1992 | Kawakami et al. |
| 5,121,329 A | 6/1992 | Crump |
| 5,122,441 A | 6/1992 | Lawton et al. |
| 5,123,734 A | 6/1992 | Spence et al. |
| 5,127,037 A | 6/1992 | Bynum |
| 5,128,235 A | 7/1992 | Vassiliou et al. |
| 5,130,064 A | 7/1992 | Smalley et al. |
| 5,132,143 A | 7/1992 | Deckard |
| 5,133,987 A | 7/1992 | Spence et al. |
| 5,134,569 A | 7/1992 | Masters |
| 5,135,379 A | 8/1992 | Fudim |
| 5,135,695 A | 8/1992 | Marcus |
| 5,137,662 A | 8/1992 | Hull et al. |
| 5,139,338 A | 8/1992 | Pomerantz et al. |
| 5,139,711 A | 8/1992 | Nakamura et al. |
| 5,141,680 A | 8/1992 | Almquist et al. |
| 5,143,663 A | 9/1992 | Leyden et al. |
| 5,143,817 A | 9/1992 | Lawton et al. |
| 5,147,587 A | 9/1992 | Marcus et al. |
| 5,149,548 A | 9/1992 | Yamane et al. |
| 5,151,813 A | 9/1992 | Yamamoto et al. |
| 5,154,762 A | 10/1992 | Mitra et al. |
| 5,155,321 A | 10/1992 | Grube et al. |
| 5,155,324 A | 10/1992 | Deckard et al. |
| 5,157,423 A | 10/1992 | Zur et al. |
| 5,158,858 A | 10/1992 | Lawton et al. |
| 5,164,882 A | 11/1992 | Kanai et al. |
| 5,167,882 A | 12/1992 | Jacobine et al. |
| 5,169,579 A | 12/1992 | Marcus et al. |
| 5,171,490 A | 12/1992 | Fudim |
| 5,173,220 A | 12/1992 | Reiff et al. |
| 5,174,931 A | 12/1992 | Almquist et al. |
| 5,174,943 A | 12/1992 | Hull |
| 5,175,077 A | 12/1992 | Grossa et al. |
| 5,176,188 A | 1/1993 | Quinn et al. |
| 5,182,055 A | 1/1993 | Allison et al. |
| 5,182,056 A | 1/1993 | Spence et al. |
| 5,182,134 A | 1/1993 | Sato |
| 5,182,715 A | 1/1993 | Vorgitch et al. |
| 5,183,598 A | 2/1993 | Helle et al. |
| 5,184,307 A | 2/1993 | Hull et al. |
| 5,192,469 A | 3/1993 | Smalley et al. |
| 5,192,559 A | 3/1993 | Hull et al. |
| 5,198,159 A | 3/1993 | Nakamura et al. |
| 5,203,944 A | 4/1993 | Prinz et al. |
| 5,204,055 A | 4/1993 | Sachs et al. |
| 5,204,124 A | 4/1993 | Secretan et al. |
| 5,204,823 A | 4/1993 | Schlotterbeck |
| 5,207,371 A | 5/1993 | Prinz et al. |
| 5,209,878 A | 5/1993 | Smalley et al. |
| 5,216,616 A | 6/1993 | Masters |
| 5,217,653 A | 6/1993 | Mashinsky et al. |
| 5,234,636 A | 8/1993 | Hull et al. |
| 5,236,637 A | 8/1993 | Hull |
| 5,236,812 A | 8/1993 | Vassiliou et al. |
| 5,238,614 A | 8/1993 | Uchinono et al. |
| 5,238,639 A | 8/1993 | Vinson et al. |
| 5,247,180 A | 9/1993 | Mitcham et al. |
| 5,248,249 A | 9/1993 | Yamamoto et al. |
| 5,248,456 A | 9/1993 | Evans, Jr. et al. |
| 5,252,264 A | 10/1993 | Forderhase et al. |
| 5,256,340 A | 10/1993 | Allison et al. |
| 5,258,146 A | 11/1993 | Almquist et al. |
| 5,260,009 A | 11/1993 | Penn |
| 5,263,130 A | 11/1993 | Pomerantz et al. |
| 5,264,061 A | 11/1993 | Juskey et al. |
| 5,267,013 A | 11/1993 | Spence |
| 5,273,581 A | 12/1993 | Koslowski et al. |
| 5,273,691 A | 12/1993 | Hull et al. |
| 5,275,916 A | 1/1994 | Kato |
| 5,278,442 A | 1/1994 | Prinz et al. |
| 5,279,665 A | 1/1994 | Yunovich et al. |
| 5,281,789 A | 1/1994 | Merz et al. |
| 5,286,573 A | 2/1994 | Prinz et al. |
| 5,287,435 A | 2/1994 | Cohen et al. |
| 5,289,214 A | 2/1994 | Zur et al. |
| 5,296,062 A | 3/1994 | Bourell et al. |
| 5,296,335 A | 3/1994 | Thomas et al. |
| 5,301,415 A | 4/1994 | Prinz et al. |
| 5,303,141 A | 4/1994 | Batchelder et al. |
| 5,306,446 A | 4/1994 | Howe |
| 5,306,447 A | 4/1994 | Marcus et al. |
| 5,316,580 A | 5/1994 | Deckard |
| 5,328,539 A | 7/1994 | Sato |
| 5,338,611 A | 8/1994 | Lause et al. |
| 5,340,433 A | 8/1994 | Crump |
| 5,340,656 A | 8/1994 | Sachs et al. |
| 5,342,566 A | 8/1994 | Schafer et al. |
| 5,342,919 A | 8/1994 | Dickens, Jr. et al. |
| 5,344,298 A | 9/1994 | Hull |

| | | | | | |
|---|---|---|---|---|---|
| 5,345,391 A | 9/1994 | Hull et al. | 5,582,876 A | 12/1996 | Langer et al. |
| 5,345,414 A | 9/1994 | Nakamura et al. | 5,587,913 A | 12/1996 | Abrams et al. |
| 5,348,693 A | 9/1994 | Taylor et al. | 5,591,563 A | 1/1997 | Suzuki et al. |
| 5,352,310 A | 10/1994 | Natter | 5,593,531 A | 1/1997 | Penn |
| 5,352,405 A | 10/1994 | Beaman et al. | 5,594,652 A | 1/1997 | Penn et al. |
| 5,355,318 A | 10/1994 | Dionnet et al. | 5,595,597 A | 1/1997 | Fogel et al. |
| 5,358,673 A | 10/1994 | Heller et al. | 5,595,703 A | 1/1997 | Swaelens et al. |
| 5,364,889 A | 11/1994 | Quinn et al. | 5,596,504 A | 1/1997 | Tata et al. |
| 5,365,996 A | 11/1994 | Crook | 5,597,520 A | 1/1997 | Smalley et al. |
| 5,370,692 A | 12/1994 | Fink et al. | 5,597,589 A | 1/1997 | Deckard |
| 5,376,320 A | 12/1994 | Tiefenbacher et al. | 5,598,340 A | 1/1997 | Medard et al. |
| 5,382,289 A | 1/1995 | Bambauer et al. | 5,599,651 A | 2/1997 | Steinmann et al. |
| 5,382,308 A | 1/1995 | Bourell et al. | 5,603,797 A | 2/1997 | Thomas et al. |
| 5,385,772 A | 1/1995 | Slovinsky et al. | 5,605,941 A | 2/1997 | Steinmann et al. |
| 5,386,500 A | 1/1995 | Pomerantz et al. | 5,608,814 A | 3/1997 | Gilmore et al. |
| 5,387,380 A | 2/1995 | Cima et al. | 5,609,812 A | 3/1997 | Childers et al. |
| 5,391,072 A | 2/1995 | Lawton et al. | 5,609,813 A | 3/1997 | Allison et al. |
| 5,391,460 A | 2/1995 | Dougherty et al. | 5,610,824 A | 3/1997 | Vinson et al. |
| 5,393,613 A | 2/1995 | MacKay | 5,611,883 A | 3/1997 | Tompkins et al. |
| 5,402,351 A | 3/1995 | Batchelder et al. | 5,614,075 A | 3/1997 | Andre, Sr. |
| 5,415,820 A | 5/1995 | Furuta et al. | 5,616,293 A | 4/1997 | Ashtiani-Zarandi et al. |
| 5,418,112 A | 5/1995 | Mirle et al. | 5,616,294 A | 4/1997 | Deckard |
| 5,426,722 A | 6/1995 | Batchelder | 5,622,577 A | 4/1997 | O'Connor |
| 5,429,788 A | 7/1995 | Ribble et al. | 5,622,811 A | 4/1997 | Ogue et al. |
| 5,429,908 A | 7/1995 | Hokuf et al. | 5,626,919 A | 5/1997 | Chapman et al. |
| 5,430,666 A | 7/1995 | DeAngelis et al. | 5,630,981 A | 5/1997 | Hull |
| 5,432,045 A | 7/1995 | Narukawa et al. | 5,632,848 A | 5/1997 | Richards et al. |
| 5,433,280 A | 7/1995 | Smith | 5,633,021 A | 5/1997 | Brown et al. |
| 5,435,902 A | 7/1995 | Andre, Sr. | 5,637,169 A | 6/1997 | Hull et al. |
| 5,437,964 A | 8/1995 | Lapin et al. | 5,637,175 A | 6/1997 | Feygin et al. |
| 5,439,622 A | 8/1995 | Pennisi et al. | 5,639,070 A | 6/1997 | Deckard |
| 5,447,822 A | 9/1995 | Hull et al. | 5,639,402 A | 6/1997 | Barlow et al. |
| 5,450,205 A | 9/1995 | Sawin et al. | 5,639,413 A | 6/1997 | Crivello |
| 5,458,825 A | 10/1995 | Grolman et al. | 5,640,667 A | 6/1997 | Freitag et al. |
| 5,460,758 A | 10/1995 | Langer et al. | 5,641,448 A | 6/1997 | Yeung et al. |
| 5,461,088 A | 10/1995 | Wolf et al. | 5,645,973 A | 7/1997 | Hofmann et al. |
| 5,468,886 A | 11/1995 | Steinmann et al. | 5,648,450 A | 7/1997 | Dickens, Jr. et al. |
| 5,470,689 A | 11/1995 | Wolf et al. | 5,649,277 A | 7/1997 | Greul et al. |
| 5,474,719 A | 12/1995 | Fan et al. | 5,650,260 A | 7/1997 | Onishi |
| 5,482,659 A | 1/1996 | Sauerhoefer | 5,651,934 A | 7/1997 | Almquist et al. |
| 5,490,882 A | 2/1996 | Sachs et al. | 5,653,925 A | 8/1997 | Batchelder |
| 5,490,962 A | 2/1996 | Cima et al. | 5,656,230 A | 8/1997 | Khoshevis |
| 5,491,643 A | 2/1996 | Batchelder | 5,658,412 A | 8/1997 | Retallick et al. |
| 5,494,618 A | 2/1996 | Sitzmann et al. | 5,658,712 A | 8/1997 | Steinmann et al. |
| 5,495,029 A | 2/1996 | Steinmann et al. | 5,659,478 A | 8/1997 | Pennisi et al. |
| 5,495,328 A | 2/1996 | Spence et al. | 5,660,621 A | 8/1997 | Bredt |
| 5,498,782 A | 3/1996 | Rex | 5,660,900 A | 8/1997 | Andersen et al. |
| 5,500,069 A | 3/1996 | Ogue et al. | 5,663,883 A | 9/1997 | Thomas et al. |
| 5,501,824 A | 3/1996 | Almquist et al. | 5,665,401 A | 9/1997 | Serbin et al. |
| 5,503,785 A | 4/1996 | Crump et al. | 5,667,820 A | 9/1997 | Heller et al. |
| 5,503,793 A | 4/1996 | Uchinono et al. | 5,672,312 A | 9/1997 | Almquist et al. |
| 5,506,046 A | 4/1996 | Andersen et al. | 5,674,921 A | 10/1997 | Regula et al. |
| 5,506,087 A | 4/1996 | Lapin et al. | 5,676,904 A | 10/1997 | Almquist et al. |
| 5,506,607 A | 4/1996 | Sanders, Jr. et al. | 5,677,107 A | 10/1997 | Neckers |
| 5,507,336 A | 4/1996 | Tobin | 5,684,713 A | 11/1997 | Asada et al. |
| 5,510,226 A | 4/1996 | Lapin et al. | 5,688,464 A | 11/1997 | Jacobs et al. |
| 5,512,162 A | 4/1996 | Sachs et al. | 5,693,144 A | 12/1997 | Jacobs et al. |
| 5,514,232 A | 5/1996 | Burns | 5,695,707 A | 12/1997 | Almquist et al. |
| 5,514,378 A | 5/1996 | Mikos et al. | 5,697,043 A | 12/1997 | Baskaran et al. |
| 5,518,680 A | 5/1996 | Cima et al. | 5,698,485 A | 12/1997 | Bruck et al. |
| 5,518,860 A | 5/1996 | Niikura et al. | 5,700,406 A | 12/1997 | Menhennett et al. |
| 5,519,816 A | 5/1996 | Pomerantz et al. | 5,703,138 A | 12/1997 | Cantor et al. |
| 5,525,051 A | 6/1996 | Takano | 5,705,116 A | 1/1998 | Sitzmann et al. |
| 5,527,877 A | 6/1996 | Dickens, Jr. et al. | 5,705,117 A | 1/1998 | O'Connor et al. |
| 5,534,059 A | 7/1996 | Immordino, Jr. | 5,705,316 A | 1/1998 | Steinmann et al. |
| 5,534,104 A | 7/1996 | Langer et al. | 5,707,578 A | 1/1998 | Johnson et al. |
| 5,536,467 A | 7/1996 | Reichle et al. | 5,707,780 A | 1/1998 | Lawton et al. |
| 5,545,367 A | 8/1996 | Bae et al. | 5,711,911 A | 1/1998 | Hull |
| 5,554,336 A | 9/1996 | Hull | 5,713,410 A | 2/1998 | LaSalle et al. |
| 5,555,176 A | 9/1996 | Menhennett et al. | 5,717,599 A | 2/1998 | Menhennett et al. |
| 5,555,481 A | 9/1996 | Rock et al. | 5,718,279 A | 2/1998 | Satoh et al. |
| 5,556,590 A | 9/1996 | Hull | 5,718,757 A | 2/1998 | Guillou et al. |
| 5,569,349 A | 10/1996 | Almquist et al. | 5,727,138 A | 3/1998 | Harada et al. |
| 5,569,431 A | 10/1996 | Hull | 5,728,345 A | 3/1998 | Hlavaty et al. |
| 5,571,471 A | 11/1996 | Hull | 5,730,817 A | 3/1998 | Feygin et al. |
| 5,572,431 A | 11/1996 | Brown et al. | 5,730,925 A | 3/1998 | Mattes et al. |
| 5,573,721 A | 11/1996 | Gillette | 5,731,388 A | 3/1998 | Suzuki et al. |
| 5,573,722 A | 11/1996 | Hull | 5,733,497 A | 3/1998 | McAlea et al. |
| 5,573,889 A | 11/1996 | Hofmann et al. | 5,738,817 A | 4/1998 | Danforth et al. |

| | | | |
|---|---|---|---|
| 5,738,921 A | 4/1998 | Andersen et al. |
| 5,740,051 A | 4/1998 | Sanders, Jr. et al. |
| 5,746,844 A | 5/1998 | Sterett et al. |
| 5,746,967 A | 5/1998 | Hoy et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,772,947 A | 6/1998 | Hull et al. |
| 5,783,358 A | 7/1998 | Schulthess et al. |
| 5,800,756 A | 9/1998 | Andersen et al. |
| 5,805,971 A | 9/1998 | Akedo |
| 5,851,465 A | 12/1998 | Bredt |
| 5,870,307 A | 2/1999 | Hull et al. |
| 5,902,441 A | 5/1999 | Bredt et al. |
| 5,902,537 A | 5/1999 | Almquist et al. |
| 5,940,674 A | 8/1999 | Sachs et al. |
| 5,943,235 A | 8/1999 | Earl et al. |
| 5,948,874 A | 9/1999 | Pike et al. |
| 5,965,776 A | 10/1999 | Leppard et al. |
| 5,976,339 A | 11/1999 | Andre, Sr. |
| 6,007,318 A | 12/1999 | Russell et al. |
| 6,071,675 A | 6/2000 | Teng |
| 6,077,887 A | 6/2000 | Thuresson et al. |
| 6,112,109 A | 8/2000 | D'Urso et al. |
| 6,136,088 A | 10/2000 | Farrington |
| 6,136,948 A | 10/2000 | Dickens, Jr. et al. |
| 6,147,138 A | 11/2000 | Hochsmann et al. |
| 6,193,922 B1 | 2/2001 | Ederer et al. |
| 6,243,616 B1 | 6/2001 | Droscher et al. |
| 6,299,677 B1 | 10/2001 | Johnson et al. |
| 6,348,679 B1 | 2/2002 | Ryan et al. |
| 6,363,606 B1 | 4/2002 | Johnson, Jr. et al. |
| 6,375,874 B1 | 4/2002 | Russell et al. |
| 6,378,974 B1 | 4/2002 | Oelbrandt et al. |
| 6,397,922 B1 | 6/2002 | Sachs et al. |
| 6,401,001 B1 | 6/2002 | Jang et al. |
| 6,403,002 B1 | 6/2002 | van der Geest et al. |
| 6,416,850 B1 | 7/2002 | Bredt et al. |
| 6,423,255 B1 | 7/2002 | Hoechsmann et al. |
| 6,433,038 B1 | 8/2002 | Tanabe et al. |
| 6,531,086 B1 | 3/2003 | Larsson et al. |
| 6,540,784 B2 | 4/2003 | Barlow et al. |
| 6,600,142 B2 | 7/2003 | Ryan et al. |
| 6,610,429 B2 | 8/2003 | Bredt et al. |
| 6,713,125 B1 | 3/2004 | Sherwood et al. |
| 6,740,423 B2 | 5/2004 | Murase |
| 6,742,456 B1 | 6/2004 | Kasperchik et al. |
| 6,780,368 B2 | 8/2004 | Liu et al. |
| 6,799,959 B1 | 10/2004 | Tochimoto et al. |
| 6,884,311 B1 | 4/2005 | Dalvey et al. |
| 6,930,144 B2 | 8/2005 | Oriakhi |
| 6,989,115 B2 | 1/2006 | Russell et al. |
| 7,037,382 B2 | 5/2006 | Davidson et al. |
| 7,049,363 B2 | 5/2006 | Shen |
| 7,087,109 B2 | 8/2006 | Bredt et al. |
| 7,120,512 B2 | 10/2006 | Kramer et al. |
| 7,261,541 B2 | 8/2007 | Fong |
| 7,285,234 B2 | 10/2007 | Pfeifer et al. |
| 7,300,613 B2 | 11/2007 | Sano et al. |
| 7,332,537 B2 | 2/2008 | Bredt et al. |
| 7,569,273 B2 | 8/2009 | Bredt et al. |
| 7,674,423 B2 | 3/2010 | Sano |
| 7,905,951 B2 | 3/2011 | Williams |
| 2001/0014402 A1 | 8/2001 | Murase |
| 2001/0050031 A1 | 12/2001 | Bredt et al. |
| 2002/0106412 A1 | 8/2002 | Rowe et al. |
| 2003/0054218 A1 | 3/2003 | Hampden-Smith et al. |
| 2003/0090034 A1 | 5/2003 | Mulhaupt et al. |
| 2003/0143268 A1 | 7/2003 | Pryce Lewis et al. |
| 2003/0173695 A1 | 9/2003 | Monkhouse et al. |
| 2004/0012112 A1 | 1/2004 | Davidson et al. |
| 2004/0038009 A1 | 2/2004 | Leyden et al. |
| 2004/0056378 A1 | 3/2004 | Bredt et al. |
| 2004/0062814 A1 | 4/2004 | Rowe et al. |
| 2004/0138336 A1 | 7/2004 | Bredt et al. |
| 2004/0166187 A1 | 8/2004 | Fong |
| 2004/0173946 A1 | 9/2004 | Pfeifer et al. |
| 2004/0232583 A1 | 11/2004 | Monsheimer et al. |
| 2005/0001356 A1 | 1/2005 | Tochimoto et al. |
| 2005/0003189 A1 | 1/2005 | Bredt et al. |
| 2005/0017394 A1 | 1/2005 | Hochsmann et al. |
| 2005/0059757 A1 | 3/2005 | Bredt et al. |
| 2005/0080191 A1 | 4/2005 | Kramer et al. |
| 2005/0093194 A1 | 5/2005 | Oriakhi et al. |
| 2005/0104241 A1 | 5/2005 | Kritchman et al. |
| 2005/0110177 A1 | 5/2005 | Schulman et al. |
| 2005/0179167 A1 | 8/2005 | Hachikian |
| 2005/0197431 A1 | 9/2005 | Bredt et al. |
| 2005/0212163 A1 | 9/2005 | Bausinger et al. |
| 2005/0230870 A1 | 10/2005 | Oriakhi |
| 2006/0071367 A1 | 4/2006 | Hunter et al. |
| 2006/0141145 A1 | 6/2006 | Davidson et al. |
| 2006/0208388 A1 | 9/2006 | Bredt et al. |
| 2006/0230984 A1 | 10/2006 | Bredt et al. |
| 2007/0007698 A1 | 1/2007 | Sano |
| 2007/0029698 A1 | 2/2007 | Rynerson et al. |
| 2007/0135531 A1 | 6/2007 | Norcini et al. |
| 2007/0241482 A1 | 10/2007 | Giller et al. |
| 2008/0138515 A1 | 6/2008 | Williams |
| 2008/0187711 A1 | 8/2008 | Alam et al. |
| 2008/0281019 A1 | 11/2008 | Giller et al. |
| 2011/0130489 A1 | 6/2011 | Williams |

FOREIGN PATENT DOCUMENTS

| | | | |
|---|---|---|---|
| DE | 3048506 A1 | 7/1982 |
| DE | 4012044 | 10/1991 |
| DE | 19727677 | 1/1999 |
| DE | 19853834 | 5/2000 |
| DE | 10158233 | 3/2003 |
| EP | 0431924 | 6/1991 |
| EP | 0540203 | 5/1993 |
| EP | 1226019 B1 | 7/2002 |
| EP | 1475221 A | 11/2004 |
| EP | 1491517 | 12/2004 |
| EP | 1498277 A | 1/2005 |
| EP | 1512519 A | 3/2005 |
| EP | 1623816 | 2/2006 |
| GB | 2048235 A | 12/1980 |
| GB | 2155944 A | 10/1985 |
| JP | 56-096762 A | 8/1981 |
| JP | 62260754 A | 11/1987 |
| JP | 02-307730 A | 12/1990 |
| JP | 3287683 | 12/1991 |
| JP | 5025898 A | 2/1993 |
| JP | 06289612 | 10/1994 |
| JP | 08-192468 A | 7/1996 |
| JP | 9241311 | 9/1997 |
| JP | 10-182904 A | 7/1998 |
| JP | 11116875 | 4/1999 |
| JP | 2001-015613 A | 1/2001 |
| JP | 2001162351 | 6/2001 |
| WO | WO-93-19019 | 9/1993 |
| WO | WO-93/20112 A1 | 10/1993 |
| WO | WO-93-25336 | 12/1993 |
| WO | WO-94-12328 | 6/1994 |
| WO | WO-94/20274 A1 | 9/1994 |
| WO | WO-95-30503 | 11/1995 |
| WO | WO-96-06881 | 3/1996 |
| WO | WO-97-11835 | 4/1997 |
| WO | WO-97-26302 | 7/1997 |
| WO | WO-97/032671 | 9/1997 |
| WO | WO-98-09798 | 3/1998 |
| WO | WO-9809798 A1 | 3/1998 |
| WO | WO-98-28124 | 7/1998 |
| WO | WO-01-34371 | 5/2001 |
| WO | WO-01/78969 A2 | 10/2001 |
| WO | WO-02-38677 | 5/2002 |
| WO | WO-02-064354 | 8/2002 |
| WO | WO-03-016030 | 2/2003 |
| WO | WO-2004-048463 | 6/2004 |
| WO | WO-2004-062927 | 7/2004 |
| WO | WO-2004-096514 | 11/2004 |
| WO | WO-2005-011959 | 2/2005 |
| WO | WO-2005-023524 | 3/2005 |
| WO | WO-2005-025074 | 3/2005 |
| WO | WO-2005-090055 | 9/2005 |

| | | |
|---|---|---|
| WO | WO-2005-105412 | 11/2005 |
| WO | WO-2007-039450 | 4/2007 |
| WO | WO-2007-147625 | 12/2007 |

OTHER PUBLICATIONS

Aranson et al., *The Physics of Granular Media*, J. Hinrichsen & D. Wolf, eds, Wiley-VCH, (2004) pp. 143-164.

Borland, "Characterization of Fundamental and Reticulated Biomedical Polymer Structures Fabricated by Three Dimensional Printing," Thesis, MIT, Jun. 1995.

Boyer et al., eds., "Metals Handbook," American Society for Metals, pp. 23.5, 23.8-23.13, (1985).

Brandup, et al., *Polymer Handbook*, John Wiley & Sons, Inc. (1999) pp. 675-714.

Das, *Advanced Soil Mechanics*, Hemisphere Pr., (2007) pp. 313-326.

Definition of "Colorant," Hawley's Condensed Chemical Dictionary, 14th Ed. (2001) p. 287.

Ederer, "A 3D Print Process for Inexpensive Plastic Parts," Presentation for the Austin Solid Freeform Conference, 1995.

European Search Report for 03029489.6, Feb. 16, 2004, 3 pgs.

European Search Report for European Application No. 04 00 1558, Apr. 27, 2006, 5 pgs.

Examination report for European patent Application No. 01 927 008.1, mailed Jan. 23, 2008, 7 pages.

Examination report for European patent Application No. 01 927 008.1, mailed May 11, 2009 (3 pages).

Examination report for European patent Application No. 03759353.0, dated Jun. 21, 2007, 3 pages.

Examination report for European patent Application No. 03759353.0, dated Mar. 25, 2008, 7 pages.

Examination report for European patent Application No. 03759353.0, dated Nov. 21, 2008, 4 pages.

Examination report for European patent Application No. 03759353.0, dated Oct. 27, 2005, 5 pages.

Examination report for European patent Application No. 04 752 633.0, mailed Apr. 22, 2009 (3 pages).

Examination report for European patent Application No. 05024830.1, mailed Jan. 23, 2009, 8 pages.

Examination report for European patent Application No. 05024830.1, mailed Mar. 5, 2010 (4 pages).

Examination report for European patent Application No. 00 976 896.1-2307, Jan. 28, 2003 (5 pages).

Examination report in Canadian Patent Application No. 2,338,617, mailed Aug. 17, 2007 (2 pages).

German, Powder Injection Molding, (1990), pp. 32-43 and 92-95.

Grant, Julius, Editor, "Hackh's Chemical Dictionary" Fourth Edition (1972, McGraw-Hill Book Company, New York), p. 250, "ethyl acetate."

Hamill, Patent Search Report for U.S. Appl. No. 12/035,743, dated Jan. 30, 2008, 3 pages.

Hamill, Search Report dated Jan. 4, 2008, 3 pages.

http://toxics.usgs.gov/definitions/kow.html, printed Jun. 24, 2008.

http://www.cibasc.com/brightening.htm, printed Jun. 24, 2008.

http://www.devicelink.com/mddi/archive/99/09/006.html, printed Jun. 24, 2008.

International Preliminary Examination Report for Int'l Application No. PCT/US01/12220, Mar. 14, 2003.

International Preliminary Examination Report for PCT/US97/15041, Oct. 19, 1998, 9 pages.

International Preliminary Report on Patentability for Intl. Application No. PCT/US2004/027549 (Dec. 6, 2007).

International Preliminary Report on Patentability for Intl. Application No. PCT/US2007/025075, mailed Jun. 18, 2009 (9 pages).

International Preliminary Report on Patentability for Intl. Application No. PCT/US2008/000366, mailed Jul. 23, 2009 (12 pages).

International Preliminary Report on Patentability for Intl. Application No. PCT/US2008/002362, mailed Sep. 3, 2009 (10 pages).

International Preliminary Report on Patentability for PCT/US2007/008046, mailed Oct. 8, 2008 (14 pages).

International Preliminary Report on Patentability, Application No. PCT/US2004/015644, Nov. 25, 2005, 6 pgs.

International Search Report & Written Opinion for PCT/US2007/008046, Nov. 15, 2007, 23 pages.

International Search Report & Written Opinion for PCT/US2007/025075, mailed Jun. 12, 2008.

International Search Report and Written Opinion for PCT/US2004/027549.

International Search Report and Written Opinion for PCT/US2008/002362, mailed Nov. 11, 2008.

International Search Report for PCT/US03/29714, Feb. 10, 2004, 4 pages.

International Search Report for PCT/US2008/000366, mailed Jun. 20, 2008.

International Search Report for PCT/US97/15041, Jan. 12, 1998, 4 pgs.

International Search Report for PCT/US99/20628, Jan. 21, 2000, 3 pages.

International Search Report of Int'l Application No. PCT/US01/12220, Apr. 15, 2002.

International search Report of Int'l Application No. PCT/US04/015644, Oct. 24, 2005.

Invitation to Pay Additional Fees & Partial ISR for PCT/US2007/008046, Sep. 18, 2007 (6 pages).

Khanuja, "Origin and Control of Anisotropy in Three Dimensional Printing of Structural Ceramics," Thesis, MIT, Feb. 1996.

Knapczyk, "Polyallyl Glycidyl Ether Resins for Very Fast Curing High Performance Coatings," 65th Ann. Meeting of Feder. of Soc. for Coating Tech., Oct. 1987, 16 pages.

Office Action in European Patent Application No. 01927008.1, mailed Oct. 1, 2009, 4 pages.

Office Action in European Patent Application No. 04001558.8, mailed Jun. 10, 2010, 5 pages.

Office Action in European Patent Application No. 04001558.8, mailed Oct. 2, 2009, 3 pages.

Office Action in European Patent Application No. 04752633.0, mailed Jun. 11, 2010, 4 pages.

Office Action in Japanese Patent Application No. 2000-579442, mailed May 11, 2010, 5 pages (translation).

Office Action in Japanese Patent Application No. 2000-579442, mailed Sep. 8, 2009, 3 pages (translation).

Office Action in Japanese Patent Application No. 2001-536349, mailed Jun. 1, 2010, 3 pages (translation).

Office Action in Japanese Patent Application No. 2004-540142, mailed Feb. 16, 2010, 6 pages (translation).

Office Action in Japanese Patent Application No. 2006-533208, mailed Nov. 10, 2009, 4 pages (translation).

Office Action in Japanese Patent Application No. 549079/98, mailed Mar. 24, 2009, 2 pages (translation).

Office Action in Japanese Patent Application No. 549079/98, mailed Nov. 27, 2007, 3 pages.

Office Action in the The People's Republic of China, Application No. 200480018360, Oct. 13, 2006, 5pages.

Official Action from Canadian Intellectual Property Office for Canadian Application Serial No. 2,388,046, dated Apr. 10, 2006.

Pizzi et al., Handbook of Adhesive Technology, pp. 761-773, Marcel Dekker, Inc. (2003).

Rulison, "Wettability Studies for Porous Solids Including Powders and Fibrous Materials—Technical Notice # 302," (1996).

Written Opinion for PCT/US99/20628, Jul. 27, 2000, 10 pages.

Examination report for European patent Application No. 05024830.1, mailed Jan. 27, 2011 (5 pages)

Office Action in Japanese Patent Application No. 2000-579442, mailed Jul. 19, 2011, 10 pages (with translation).

Office Action in Japanese Patent Application No. 2001-576254, Mar. 22, 2011, 6 pages.

Office Action in Korean Patent Application No. 10-2011-7007842, Jul. 8, 2011, 6 pages.

Office Action in Chinese Patent Application No. 200880005474.8, mailed Aug. 16, 2011, 9 pages.

Office Action in Japanese Patent Application No. 2001-576254, Jul. 19, 2011, 3 pages.

Office Action in Chinese Patent Application No. 200780048035.0, mailed Sep. 23, 2011, 12 pages.

Office Action in Japanese Patent Application No. 2001-576254, mailed Oct. 25, 2011, 19 pages.

US 4,937,420, 06/1990, Deckard (withdrawn)

THREE DIMENSIONAL PRINTING MATERIAL SYSTEM AND METHOD USING PLASTICIZER-ASSISTED SINTERING

RELATED APPLICATIONS

This application claims priority to and is a divisional of U.S. patent application Ser. No. 12/035,743, filed Feb. 22, 2008, which claims the benefit of U.S. Provisional Patent Application Ser. No. 60/902,782, filed Feb. 22, 2007; the disclosures of both applications are hereby incorporated by reference in their entireties.

TECHNICAL FIELD

This invention relates generally to rapid prototyping techniques and, more particularly, to a three-dimensional printing material and method using plasticizer-assisted sintering.

BACKGROUND

The field of rapid prototyping involves the production of prototype articles and small quantities of functional parts, as well as structural ceramics and ceramic shell molds for metal casting, directly from computer-generated design data.

Two well-known methods for rapid prototyping include a selective laser sintering process and a liquid binder three dimensional printing process. These techniques are similar, to the extent that they both use layering techniques to build three-dimensional articles. Both methods form successive thin cross-sections of the desired article. The individual cross-sections are formed by bonding together adjacent grains of a granular, i.e. particulate material on a generally planar surface of a bed of the granular material. Each layer is bonded to a previously formed layer to form the desired three-dimensional article at the same time as the grains of each layer are bonded together. The laser-sintering and liquid binder techniques are advantageous, because they create parts directly from computer-generated design data and can produce parts having complex geometries. Moreover, three dimensional printing can be quicker and less expensive than machining of prototype parts or production of cast or molded parts by conventional "hard" or "soft" tooling techniques, that can take from a few weeks to several months, depending on the complexity of the item.

An early three dimensional printing technique, described in U.S. Pat. No. 5,204,055, incorporated herein by reference in its entirety, describes the use of an ink-jet style printing head to deliver a liquid or colloidal binder material to sequentially applied layers of powdered material. The three-dimensional ink-jet printing technique or liquid binder method involves applying a layer of a powdered material to a surface using a counter-roller. After the powdered material is applied to the surface, the ink-jet printhead delivers a liquid binder in a predetermined pattern to the layer of powder. The binder infiltrates into gaps in the powder material and hardens to bond the powder material into a solidified layer. The hardened binder also bonds each layer to the previous layer. After the first cross-sectional portion is formed, the previous steps are repeated, building successive cross-sectional portions until the final article is formed. Optionally, an adhesive can be suspended in a carrier that evaporates, leaving the hardened adhesive behind. The powdered material may be ceramic, metal, plastic or a composite material, and may also include fibers. The liquid binder material may be organic or inorganic. Typical organic binder materials used are polymeric resins or ceramic precursors, such as polycarbosilazane. Inorganic binders are used where the binder is incorporated into the final articles; silica is typically used in such an application.

As described in U.S. Pat. No. 6,007,318, incorporated herein by reference in its entirety, printed articles may be dipped or painted with a solution that infiltrates the article by capillary actions. This processing may improve handling properties of the article and prevent its decay.

The use of an absorbent filler to facilitate infiltrant absorption is described in U.S. Patent Application 2005/0059757, incorporated herein by reference in its entirety. That application describes the incorporation of thermoplastic fillers in a powder, with the activating or infiltration material being a solvent.

SUMMARY

In an embodiment, a strong printed article may be made by three dimensional printing over a substantially dry particulate material build material including an aqueous-insoluble thermoplastic particulate material. The printed article is further post-processed by infiltrating a liquid medium into the article. The liquid medium selectively plasticizes the aqueous-insoluble thermoplastic particulate material, lowering the thermoplastic's glass transition temperature. This facilitates sintering of the thermoplastic particulate material to bond together the matrix of the article, thereby increasing the article's durability.

Typical existing printing processes include a post-processing infiltration step to increase the strength of the printed article using two-component casting resins and/or adhesives or one-component cyanoacrylate adhesives to achieve greater durability to a three-dimensional article. Articles printed with the particulate material build material described herein and further infiltrated with a liquid plasticizer have strengths comparable to that of articles formed with cyanoacrylate adhesive, e.g., about 20 MPa, which has historically been proven to be sufficient for most concept modeling applications.

The infiltrant materials used for plasticized sintering may provide some advantages over other build materials. Using two-component casting resins such as epoxy-amine, isocyanate-amines, and/or isocyanate-polyol systems decreases the ease-of-use by the end-user by incorporating extra mixing steps, imposing pot-life constraints, and giving rise to safety, health, and environmental issues. One-component cyanoacrylate adhesives typically offer better ease-of-use because these materials do not require mixing, but they may create safety, heath, and environment issues such as fumes, irritation, and adhesion to skin and may not be stable when exposed to the open atmosphere for long periods of time. The plasticized assisted sintering of a build material consisting of a thermoplastic particulate increases ease of use by offering a method in which the process can be automated or semi-automated whereby the article is immersed in a stable, one component liquid medium for a predetermined amount of time and allowed to cool to a handling temperature. Stable, as used herein, refers to maintaining a consistent viscosity at a predetermined temperature when exposed to the open atmosphere for a long period of time, i.e., on the order of months.

In an aspect, an embodiment of the invention features a powder material system for three dimensional printing including a substantially dry particulate material including an aqueous-insoluble thermoplastic particulate material, plaster, and a water-soluble adhesive. The dry particulate material is suitable for use in three dimensional printing to form an article comprising a plurality of layers, the layers including a reaction product of the particulate material and an aqueous fluid that contacts the particulate material during three dimensional printing.

One or more of the following features may be included. A static and a dynamic friction coefficient of the particulate material possess a relationship defined by a Bredt parameter having a value in excess of 0.1. An internal angle of friction may be selected from a range of 40° and 70°. The particulate material may include about 5%-50% by weight of the aqueous-insoluble thermoplastic, about 25-90% by weight of the plaster, and about 5-30% by weight of a water-soluble adhesive. The aqueous-insoluble thermoplastic may include or consist essentially of high molecular weight polyethylene, polyamide, poly-cyclic-olefins, and/or combinations thereof.

The particulate material may further include a processing aid, e.g., the particulate material may include about 0.01-2.0% by weight of the processing aid. The processing aid may include or consist essentially of mineral oil, propylene glycol di(caprylate/caprate), petroleum jelly, propylene glycol, di-isobutyl phthalate, di-isononyl phthalate, polyalkyleneoxide modified heptamethyltrisiloxanes, polyalkyleneoxide modified polydimethylsiloxanes, and/or combinations thereof.

In another aspect, an embodiment of the invention features a kit including a substantially dry particulate material including an aqueous-insoluble thermoplastic particulate material, plaster, and a water-soluble adhesive. The kit also includes an aqueous fluid binder and an infiltrant.

One or more of the following features may be included. The infiltrant may include 0-99.99% by weight hydroxylated hydrocarbon, 0-99.99% by weight a solid wax, 0-99.99% by weigh a plasticizer, and 0.01-5% by weight a stabilizer.

The hydroxylated hydrocarbon may include a hydrocarbon diol with a molecular weight greater than 118 g/mol, a melting point greater than 30° C., and a kinematic viscosity of 150 centiStokes or less, preferably 50 centiStokes or less, at a temperature of at least 50° C. The hydrocarbon diol may include or consist essentially of octane diol and/or decane diol.

The infiltrant may include hydroxylated hydrocarbon that includes (i) a hydrocarbon diol with a molecular weight greater than 118 g/mol and a melting point greater than 30° C. and (ii) a plasticizer. The hydroxylated hydrocarbon may include decane diol. The plasticizer may include or consist essentially of benzene sulfonamide and/or propylene carbonate.

The hydroxylated hydrocarbon may include an alcohol with boiling point selected from a range of 25° C. to 100° C., and the plasticizer may have a boiling point selected from a range of 25° C. to 100° C. The alcohol may include or consist essentially of isopropanol. The plasticizer may include or consist essentially of ethanol.

In yet another aspect, an embodiment of the invention includes a method for forming an article by three dimensional printing. The method includes (i) providing a particulate material comprising a plurality of adjacent particles, the particulate material comprising an aqueous-insoluble thermoplastic; (ii) applying to at least some of the plurality of particles an aqueous fluid binder in an amount sufficient to bond those particles together to define the article; and (iii) immersing the article in a liquid infiltrant medium.

One or more of the following features may be included. The liquid infiltrant medium may include a hydroxylated hydrocarbon. The liquid infiltrant medium may also include a plasticizer. The particulate material may further include at least one of plaster, a water-soluble adhesive, a retarder, an accelerator, and a processing aid.

In another aspect, an embodiment of the invention features an essentially solid article manufactured by a three-dimensional printing process, the essentially solid article comprising a product of a reaction between (i) a substantially dry particulate material including an aqueous-insoluble thermoplastic particulate material, plaster, and a water-soluble adhesive; (ii) an aqueous fluid comprising water, a humectant, a rheology modifier, a surfactant, a preservative, and an optical brightening agent; and (iii) an infiltrant including a hydroxylated hydrocarbon, a wax, a plasticizer, and a stabilizer. The aqueous-insoluble thermoplastic particulate material material is plasticized by the infiltrant.

In still another embodiment, an article includes a product of (i) a substantially dry particulate material including an aqueous-insoluble thermoplastic particulate material, plaster, and a water-soluble adhesive; and (ii) an infiltrant.

The article preferably has a strength of at least 5 megapascal (MPa), more preferably at least 15 MPa, and most preferably at least 20 MPa.

BRIEF DESCRIPTION OF THE FIGURES

The following drawings are not necessarily to scale, emphasis instead being placed generally upon illustrating the principles of the invention. The foregoing and other features and advantages of the present invention, as well as the invention itself, will be more fully understood from the following description of exemplary and preferred embodiments, when read together with the accompanying drawings, in which.

DETAILED DESCRIPTION

Three Dimensional Printing

Figure 1:
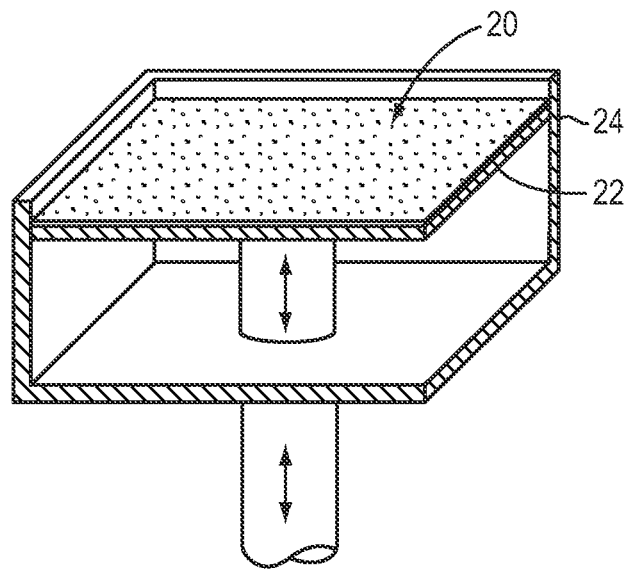
FIG. 1 is a schematic view of a first layer of a mixture of particulate material of an embodiment of the invention deposited onto a downwardly movable surface of a container on which an article is to be built, before any fluid has been delivered.

Referring to FIG. 1, in accordance with a printing method using the materials system of the present invention, a layer or film of a particulate material 20, i.e., a powder, is applied on a linearly movable surface 22 of a container 24. The layer or film of particulate material 20 may be formed in any suitable manner, for example using a counter-roller. The particulate material 20 applied to the surface includes an aqueous-insoluble thermoplastic particulate material, plaster, and a water-soluble adhesive. The particulate material 20 may also include a filler material, a processing aid material, and/or a fibrous material.

Figure 2:
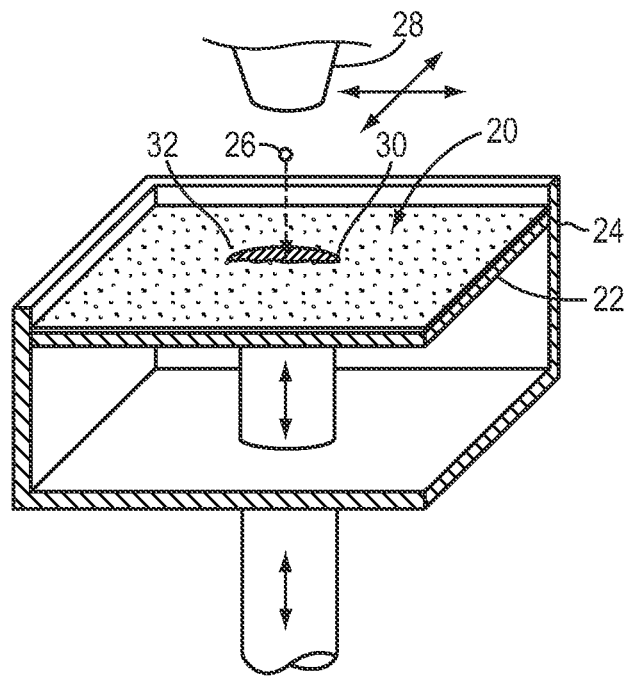
FIG. 2 is a schematic view of an ink-jet nozzle delivering a fluid to a portion of the layer of particulate material of FIG. 1 in a predetermined pattern.

Referring to FIG. 2, an ink-jet style nozzle 28 delivers an activating fluid 26, i.e., an aqueous fluid described below, to at least a portion 30 of the layer or film of the particulate mixture 20 in a two-dimensional pattern. According to the printing method, the fluid 26 is delivered to the layer or film of particulate material 20 in any predetermined two-dimensional pattern (circular, in the figures, for purposes of illustration only), using any convenient mechanism, such as a drop-on-demand (DOD) printhead driven by software in accordance with article model data from a computer-assisted-design (CAD) system.

The first portion 30 of the particulate mixture is activated by the fluid 26, causing the activated particles to adhere together to form a conglomerate of the particulate material 20 (powder) and fluid 26. The conglomerate defines an essentially solid circular layer that becomes a cross-sectional portion of an intermediate article 38 (see, e.g., FIGS. 3 and 4). As used herein, "activates" is meant to define a change in state from essentially inert to adhesive.

This definition encompasses the activation of the adhesive particulate material to bond the absorbent filler particulate material. When the fluid initially comes into contact with the particulate mixture, it immediately flows outwardly (on a microscopic scale) from the point of impact by capillary suction, dissolving the adhesive within a relatively short time period, such as the first few seconds. A typical droplet of activating fluid has a volume of about 40 picoliters (pl), and spreads to a diameter of about 100 µm after coming into contact with the particulate mixture. As the solvent dissolves the adhesive, the fluid viscosity increases dramatically, arresting further migration of the fluid from the initial point of impact. Within a few minutes, the fluid with adhesive dissolved therein infiltrates the less soluble and slightly porous particles, forming adhesive bonds between the absorbent filler particulate material as well as between the additional filler and the fiber. The activating fluid is capable of bonding together an amount of the particulate mixture that is several times the mass of a droplet of the fluid. As volatile components of the fluid evaporate, the adhesive bonds harden, joining the absorbent filler particulate material and, optionally, additional filler and fiber particulates into a rigid structure, which becomes a cross-sectional portion of the final article 40. Thus, the layers include a reaction product of the particulate material and the activiating fluid, e.g., an aqueous fluid.

Any unactivated particulate mixture 32 that was not exposed to the fluid remains loose and free-flowing on the movable surface 22. The unactivated particulate mixture is typically left in place until formation of the intermediate article 38 is complete. Leaving the unactivated, loose particulate mixture in place ensures that the intermediate article 38 is fully supported during processing, allowing features such as overhangs, undercuts, and cavities to be defined and formed without the need to use supplemental support structures. After formation of the first cross-sectional portion of the intermediate article 38, the movable surface 22 is indexed downwardly, in this embodiment, and the process is repeated.

Using, for example, a counter-rolling mechanism, a second film or layer of the particulate mixture is then applied over the first layer, covering both the rigid first cross-sectional portion, and any proximate loose particulate mixture. A second application of fluid follows in the manner described above, dissolving the adhesive and forming adhesive bonds between at least a portion of the previous cross-sectional formed portion, the absorbent filler particulate material, and, optionally, additional filler and fiber of the second layer, and hardening to form a second rigid cross-sectional portion added to the first rigid cross-sectional portion of the final article. The movable surface 22 is again indexed downward.

Figure 3:
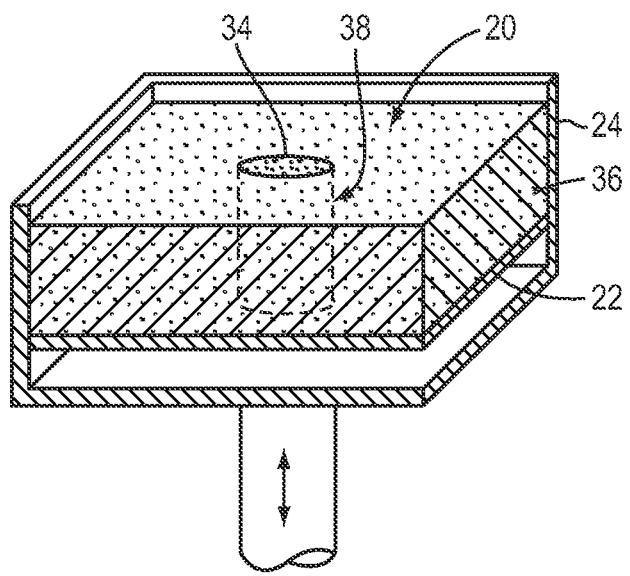
FIG. 3 is a schematic view of a final article of an embodiment of the invention enclosed in the container, the article made by a series of steps illustrated in FIG. 2 and still immersed in the loose unactivated particles.

The previous steps of applying a layer of particulate mixture, including the adhesive, applying the activating fluid, and indexing the movable surface 22 downward are repeated until the intermediate article 38 is completed. Referring to FIG. 3, the intermediate article 38 may be any shape, such as cylindrical. At the end of the process, only a top surface 34 of the intermediate article 38 is visible in the container 24. The intermediate article 38 is typically completely immersed in a surrounding bed 36 of unactivated particulate material. Alternatively, an article could be formed in layers upward from an immovable platform, by successively depositing, smoothing, and printing a series of such layers.

Figure 4:
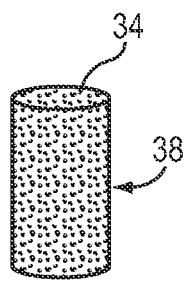
FIG. 4 is a schematic view of the final article of FIG. 3.

Referring to FIG. 4, the unactivated particulate material may be removed from the intermediate article 38 by pressurized air flow or a vacuum. After removal of the unactivated particulate material from the intermediate article 38, a post-processing treatment may be performed, such as cleaning, infiltration with stabilizing materials, painting, etc. to define a final article 40, having the same shape as intermediate article 38, but with additional desired characteristics, such as a stiffness, strength, and flexibility.

A particularly suitable infiltration method for the particulate material described herein includes immersing a finished article into a liquid infiltrant medium, i.e., a plasticizer, to increase the strength and toughness of the article. After the article is formed, it may be submerged in a liquid material and then heated to a sintering temperature. Alternatively, it may be submerged into a preheated plasticizer bath, causing in-situ diffusion and sintering.

Preferably the article is completely immersed into the liquid or molten material. The material may be melted by placing the material in a polypropylene container in an oven, e.g., a Blue M oven or a Cole Palmer StableTemp mechanically convected oven model 52100-00, with the oven temperature being sufficiently high to melt the material. The container is preferably sufficiently large for the article to be completely submerged into a liquid disposed therein. Alternatively, the material may be melted by exposure to microwaves. In a preferred embodiment, the article is completely submerged until substantially all of the entrapped air rises to the liquid's surface in the form of air bubbles.

Alternatively, liquid or molten material may be sprayed onto the article using spray bottles, nozzles, pumps or other means to completely cover the surface of the article.

The resulting essentially solid article may be the product of the reaction of (i) a substantially dry particulate material including an aqueous-insoluble thermoplastic particulate material, plaster, and a water-soluble adhesive; (ii) an aqueous fluid comprising water, a humectant, a rheology modifier, a surfactant, a preservative, and an optical brightening agent; and (iii) an infiltrant comprising a hydroxylated hydrocarbon, a wax, a plasticizer, and a stabilizer, with the aqueous-insoluble thermoplastic particulate material being plasticized by the infiltrant. An article may be the product of a substantially dry particulate material including an aqueous-insoluble thermoplastic particulate material, plaster, and a water-soluble adhesive, and an infiltrant. The article may have a strength of at least 5 MPa, preferably at least 15 MPa, and most preferably at least 20 MPa.

Particulate Material

In a preferred embodiment, a particulate material, i.e., a substantially dry particulate material, includes or consists essentially of:

| | |
|---|---|
| an aqueous-insoluble thermoplastic particulate material | 5-50 wt % |
| plaster (calcium hemihydrate) | 25-90 wt % |
| water-soluble adhesive | 5-30 wt % |
| retarder | 0.01-5 wt % |
| accelerator | 0.01-5 wt % |
| processing aids | 0.01-2.0 wt % |

An example of a preferred particulate composition is:

| | |
|---|---|
| an aqueous-insoluble thermoplastic particulate material | 15-35 wt % |
| plaster (calcium hemihydrate) | 50-80 wt % |
| water-soluble adhesive | 5-15 wt % |
| retarder | 0.01-5 wt % |
| accelerator | 0.01-3 wt % |
| processing aids | 0.01-2.0 wt % |

A preferred particle size of components of the particulate material is an average particle diameter of less than 125 microns and greater than 10 microns.

The aqueous-insoluble thermoplastic particulate material provides extra durability and increased strength when it sinters together after being plasticized by the liquid medium. A suitable aqueous-insoluble thermoplastic has a particle size greater than 20 microns and less than 100 microns, and has a glass transition temperature greater than 45° C. The aqueous-insoluble thermoplastic particulate material also is soluble and/or permeable with certain non-aqueous solvents, waxes, or hydrocarbon diols that can act as plasticizers.

An example of an appropriate aqueous-insoluble thermoplastic particulate material is a polyamide 6-3 and terephthalic acid copolymer, available under the trade name of TROGAMID, such as TROGAMID T5000 from Degussa based in Germany. According to its technical data sheet, TROGAMID T5000 exhibits a resistance to most chemicals; however, it lacks chemical resistance to certain hydroxylated hydrocarbons like ethanol, propylene glycol, and pentanediol. TROGAMID T5000 also has decreased chemical resistance against, e.g., methanol, 1-propanol, pentanol, allyl alcohol, aniline, crotonaldehyde, dimethylformamide, and glacial acetic acid. TROGAMID T5000's weakness to these types of chemicals makes it possible to use these hydroxylated hydrocarbons as plasticizers with TROGAMID T5000 to reduce its glass transition temperature to a point where it sinters together in the matrix of the three-dimensional article.

Other suitable aqueous-insoluble thermoplastic particulate materials are high molecular weight polyethylene like GUR from Ticona USA based in Florence, Ky. and cyclic polyolefins like TOPAS from TOPAS Advanced Polymers. These particular thermoplastics lack chemical resistance to aliphatic and/or aromatic solvents, and/or paraffin based oils and waxes, rendering these materials suitable for use as plasticizers for these thermoplastic materials. Yet other examples of aqueous-insoluble thermoplastic particulate materials include polyamide and poly-cyclic-olefins.

The plaster provides dimensional stability and adhesion for strength of an article formed from the particulate material. A suitable plaster for use with embodiments of the invention is calcium hemihydrate having a particle size distribution ranging from greater than 20 microns to less than 125 microns. An example of such plaster is HYDROCAL, available from USG based in Chicago, Ill. Another suitable plaster product that is whiter than HYDROCAL is the SSS Brand from San Esu based in Suita, Osaka, Japan. The whiter product imparts a more neutral color to articles than HYDROCAL, which may be desirable for attaining a wider color gamut.

The water-soluble adhesive provides adhesive strength in the system and helps to control bleed or pooling of fluid binder in selectively printed areas. A suitable water-soluble adhesive is a polymer with an average molecular weight from a range of 10,000 to 200,000 g/mol with hydrolysis greater than 85% and less than 90% and a particle size distribution ranging from greater than 5 micron to less than 125 microns. A water-soluble adhesive is a polyvinyl alcohol such as CEL-VOL 203S available from Celanese from Dallas, Tex. Another suitable resin is a maltodextrin such as STAR-DRI-1, available from A. E. Staley based in Decatur, Ill. Maltodextrin may be used to improve the stiffness of the article as it is drying and during the post processing with a liquid medium infiltrant.

A retarder may be included, such as borax. After an aqueous binder is deposited onto a plaster-containing particulate material, calcium sulfate dihydrate crystals form during gypsum setting. Retarders help decrease the growth rate of calcium sulfate dihydrate crystals, thus reducing a distortion effect known as arching in three dimensional printing. Arching is a distortion defect in which flat bottom surfaces exhibit concavity from successive layers expanding too fast.

An accelerator may be included, such as potassium sulfate, potassium aluminum sulfate, sodium sulfate, calcium sulfate dihydrate, or aluminum sulfate. The accelerator helps increase the precipitation rate of aqueous calcium sulfate into calcium sulfate dihydrate to gain an appreciable early handling strength.

Processing aids may be used to affect particulate material spreading characteristics to achieve a desirable Bredt parameter (see discussion below) and to reduce dust becoming airborne while the powder is being used. Mineral oil is a typical processing aid that affects the Bredt parameter of the particulate material. Mineral oil from Sigma-Aldrich may provide a good balance of particulate cohesion and low plasticizing of the aqueous-insoluble filler. Other examples of processing aids include propylene glycol di(caprylate/caprate), petroleum jelly, propylene glycol, di-isobutyl phthalate, di-isononyl phthalate, polyalkyleneoxide modified heptamethyltrisiloxanes, polyalkyleneoxide modified polydimethylsiloxanes, and combinations thereof.

Fluid Binder

In a preferred embodiment, a fluid binder is an aqueous fluid that includes or consists essentially of:

| | |
|---|---|
| water | 70-90 wt % |
| humectant | 1-10 wt % |
| preservative | 0.05-5 wt % |
| surfactant | 0-2 wt % |
| optical brightening agent | 0-5 wt % |

The aqueous fluid may also include rheology modifiers at a concentration of 0.01-5 wt %. As discussed below, the aqueous fluid may include a fluorescent brightener based on stilbene chemistry or distyrylbiphenyl.

Humectants may serve to keep the nozzles of the print head from drying out and forming a crust when uncapped, such as during the period when the print head is not firing droplets but moving over the build area to a new position. The type and concentration of a humectant may also influence the dynamics of droplet formation, the consistency of drop trajectory, and the curing of the article formed by three dimensional printing. Examples of suitable humectants include Glycerol and other diols from 3-10 carbons long; many other examples of humectants are known in the art. Printing may be successful with humectant levels from 1-20%, depending on the binder formulation.

The preservative may serve to prolong the shelf life of the fluid as manufactured, as well as to extend its useful life in the machine. Preservatives may have detrimental effects on print quality, and in some cases on the appearance or curing of the article being formed by three dimensional printing. It is generally desirable to choose environmentally friendly, stable, and substantially clear preservatives. An example of a suitable preservative includes Proxel GXL, manufactured by Arch Chemical. Many other suitable preservatives are available in the industry.

Surfactants are typically used to control the surface tension of the aqueous fluid. Proper surface tension helps ensure that the droplets being ejected from a print head are formed with a consistent volume, depart from the print head at the appropriate vector, and do not form satellite drops. Very high surface tension may create poor wetting when the binder impacts loose powder. Low surface tension may create poor droplet formation at the face of the print head. Surface tensions of suitable binders for use with an HP11 print head (from Hewlett-Packard) range from 30 dynes/cm to 36 dynes/cm. Suitable surfactants include Surfynol CT-171, Surfynol 465, and Surfynol 485 in ranges from 0.24 wt % to 1.5 wt %. Such products are available from Air Products. The range of viscosities of the aqueous fluid suitable for use with HP11 print heads is 1-1.35 cps. pH of the fluid may also influence the safety of the product, the effect of the binder on the reaction rate of the plaster, and the compatibility of the fluid with the materials from which the machine is constructed. An acceptable range of pH for the aqueous fluid described herein is, e.g., from 4.9 to 10.3.

The aqueous fluid may be used for three dimensional printing, such that an article printed with the aqueous fluid including the optical brightening agent has a lower chroma C* than an article printed with the aqueous fluid without the optical brightening agent. Optical brighteners are used to color correct the whiteness of a three-dimensional printed part. Optical brightening agents increase the perceived whiteness of a part by absorbing ultra violet light having a wavelength <400 nanometers (nm) and re-emitting blue light with a wavelength typically selected from a range of 400 to 450 nm, increasing the reflected light in the visible spectrum. The blue fluorescence of the optical brightener helps to overcomes the natural yellowness of the other raw materials. Quantitatively, this may be expressed as higher emission in the blue reflectance.

Liquid Infiltrant Medium

In one preferred embodiment, a liquid infiltrant includes or consists essentially of:

| | |
|---|---|
| a hydroxylated hydrocarbon | 0-99.99 wt % |
| a wax (solid at room temperature) | 0-99.99 wt % |
| a plasticizer | 0-99.99 wt % |
| stabilizer | 0.01-5 wt % |

For example, the liquid infiltrant may include or consist essentially of:

| | |
|---|---|
| a hydroxylated hydrocarbon (solid at room temperature) | 69.99-99.99 wt % |
| a plasticizer | 0-30 wt % |
| stabilizer | 0.01-5 wt % |

In another embodiment, a liquid infiltrant may include or consists essentially of:

| | |
|---|---|
| a paraffin wax (solid at room temperature) | 79.99-99.99 wt % |
| a plasticizer | 0-20 wt % |
| stabilizer | 0.01-5 wt % |

In another preferred embodiment, a liquid infiltrant includes or consists essentially of:

| | |
|---|---|
| a fugitive hydroxylated hydrocarbon (liquid at room temperature) | 30-100 wt % |
| a solvent | 0-50 wt % |
| a plasticizer | 0-30 wt % |

The hydroxylated hydrocarbon may be the primary plasticizer that reduces the glass transition temperature of the aqueous-insoluble thermoplastic particulate material. The hydroxylated hydrocarbon may also be the carrier of a secondary plasticizer that is soluble in the hydroxylated hydrocarbon and more effective in plasticizing the aqueous-insoluble thermoplastic, and where the hydroxylated hydrocarbon is less effective in plasticizing the aqueous-insoluble thermoplastic. Suitable hydroxylated hydrocarbons are ethanol, pentane-diol, octane-diol, and decanediol.

Ethanol, having a boiling point below 100° C., is a suitable fugitive plasticizer for the TROGAMID T5000; ethanol evaporates away from the printed article after infiltrating the article, with the TROGAMID T5000 sintering together within the matrix of the article. Ethanol may be too effective in plasticizing TROGAMID T5000 to an extent that an article may distort and collapse under its own weight. The plasticizing effect of ethanol may be reduced by adding another miscible hydroxylated hydrocarbon having a boiling point less than 100° C. such as isopropanol. Isopropanol does not exhibit the same plasticizing effect on TROGAMID T5000, and is fugitive as well having a boiling point well below 100° C. The addition of isopropanol to ethanol may decrease the hydrogen bonding forces of the ethanol, thereby possibly decreasing the plasticization effect of the alcohol mixture on TROGAMID T5000. However, the use of hydroxylated hydrocarbons with boiling points less than 100° C. may raise concerns of flammability and end-user safety. Octane diol and decane diols are generally more preferred hydroxylated hydrocarbons because they have higher flashpoints than ethanol, and are solid at room temperature and are liquid with a kinematic viscosity of 150 centiStokes or less, more preferably 50 centiStokes or less at temperatures greater than 50° C.

A solid wax having a melting point greater than 30° C. may be the primary plasticizer to reduce the glass transition temperature ($T_g$) of the aqueous-insoluble thermoplastic, or may be the carrier of a secondary plastics that is soluble in the solid wax when in a melted, liquid state at temperatures above 50° C. if the solid wax is not effective in lowering the $T_g$ of the aqueous-insoluble thermoplastic alone. Suitable waxes that plasticize TROGAMID T5000 are hydrocarbon diols with molecular weights greater than 118 g/mol, such as octane diol and decane diol. Another suitable solid wax is paraffin wax such as Paraplast X-Tra available from McCormick Scientific based in St. Louis, Mo., which is suitable for plasticizing both polyethylene thermoplastics like GUR and cyclic-poly-olefins like TOPAS. At a temperature of at least 50° C., the wax may have a kinematic viscosity of 150 centiStokes or less, preferably 50 centiStokes or less, to ensure a fast infiltration rate and deep penetration into an immersed article; and to facilitate easier drainage and removal of excess liquid infiltrant from the article when the article is extracted from the liquid infiltrant, thereby reducing pooling and drip defects on the article as the wax solidifies.

The plasticizer may be the sole ingredient or an additive in either a hydroxylated hydrocarbon and/or a solid wax to enhance the plasticization of the aqueous-insoluble thermoplastic particulate material. The plasticizer may be the sole ingredient that is in a liquid state when infiltrating a three dimensional article. Suitable sole plasticizers are, for example, ethanol, octane diol, and decane diol for reducing the $T_g$ of TROGAMID T5000. Paraffin waxes and mineral oil may also be suitable as sole plasticizers for polyethene and poly-cyclic poly olefins such as GUR and TOPAS respectively. A suitable mineral oil for use with an embodiment of this invention is supplied by Aldrich based in Milwaukee, Wis. The plasticizer may be used as an additive when supplied in a soluble carrier at a concentration less than 20% by weight. A suitable plasticizer used as an additive may be ethanol carried in isopropanol, or, more preferably, benzene sulfonamide carried in decane diol to assist the plasticization of TROGAMID T5000. Other suitable plasticizer additives may be used, such as ones based on carbonates, succinates, phthalates, adipates, and phosphates.

Stabilizers may be added to the liquid infiltrant medium to decrease oxidation that may lead to the discoloration of the liquid infiltrant medium when kept at temperatures above 50° C. for prolonged periods of time. Suitable stabilizers are antioxidants such as butylated hydroxytoluene.

Mechanisms of Plasticizer-Assisted Sintering

A summary of a printing/infiltration process is as follows:

a) a layer is formed of a substantially dry particulate material containing thermoplastic particulate, a plaster, and/or a water-soluble polymer such as a water-soluble adhesive;

b) an aqueous fluid binder is applied to the layer of dry particulate material in a predetermined pattern to cause binding in the areas to which the binder is applied;

c) steps (a) and (b) are repeated sequentially to define a three-dimensional article;

d) after complete setting of the thermoplastic, plaster, or water-soluble polymer, the three-dimensional article is removed from the build, i.e., from the stack of dry particulate material layers;

e) the three-dimensional article is submerged in the plasticizer or its solution, i.e., the liquid infiltrant medium, at ambient or elevated temperature; and f) optionally, the particulate material is exposed to additional energy in the form of conventional heat, visible or infrared light, microwave, or radio-frequency, for additional sintering of particulate material.

The use of certain infiltrant materials (such as plasticizers) described herein allows selective diffusion into the polymer matrix during infiltration to reduce the glass transition temperature and to increase the melt flow of the aqueous-insoluble polymer. This also results in the reduction of the inert, non-water-soluble polymer concentration in order to achieve good green strength and sagging resistance.

In an embodiment, articles are submerged into a liquid infiltrant medium and heated to the sintering temperature. In another embodiment, articles may be submerged in a preheated plasticizer bath causing in-situ diffusion and sintering. The sintering may be performed without application of additional pressure, i.e., the sintering may be substantially pressure-free.

In yet another embodiment, rather than being provided as a liquid infiltrant, the plasticizer may be a component of the particulate composition. Alternatively, the article may be placed in a heated chamber filled with plasticizer in the gaseous phase.

The particulate composition may include an inert absorbent filler is saturated with plasticizer. Here, after an article is printed, the plasticizer migrates into the polymer matrix during heat treatment.

The plasticizer may be applied as a pure substance, solution or emulsion. It may also contain solvents, surfactants, viscosity modifiers, dyes, and/or pigments.

The plasticizer may be liquid or solid at room temperature. Solid plasticizer may be applied to the particulate composition in the molten form. Use of plasticizers with high melting point typically diminishes or prevents their migration during the lifetime of an article. Liquid plasticizer may be dissolved in a high melt temperature inert solid carrier, creating material that is solid at room temperature.

One of the advantages of the processes described herein is that one may produce both rigid and rubbery articles from the same particulate composition by employing a different plasticizer system or a system that contains different concentrations of the same plasticizers. Also, uniformly colored articles may be produced by dissolving dyes in the liquid or solid plasticizer systems.

Solubility of the plasticizer in the polymer matrix of the article is determined by the polymer system, and depends on three major parameters. These parameters are: interaction between plasticizer molecules; the molecular interaction between the polymer molecules; and the mutual interaction of the polymer molecules when mixed.

Most commonly, those interactions may be calculated using the Hansen solubility parameters. These parameters allow for accurate estimation of solubility and swelling of the polymers in solvents, or in this case plasticizers. In particular, the Hansen solubility parameters represent the following intermolecular forces, the so-called Van der Waals forces: dispersion forces ($\delta_d$), dipole—dipole interactions ($\delta_p$) and hydrogen bonding forces ($\delta_h$). The total Hildebrand solubility parameter ($\delta$) may be calculated with these components as follows:

$$\delta = (\delta_d^2 + \delta_p^2 + \delta_h^2)^{1/2}$$

The concepts presented here regarding the Hildebrand and Hansen solubility parameters may be found in the *Polymer Handbook,* Brandup, J. et. al., John Wiley & Sons, Inc., 1999, the disclosure of which is incorporated herein by reference in its entirety. A close quantitative agreement between the Hansen solubility parameters of the polymer and the Hansen solubility parameters of the plasticizer implies greater solubility of the plasticizer into the polymer, thus lowering the energy typically required for sintering.

Extremely high solubility of the polymer in plasticizer may be undesirable because this may result in over-plasticization or the dissolution of the thermoplastic additive. In that case, the glass transition temperature may be close or below room temperature, which may cause distortion and weak particle bonding. In some embodiments, plasticizer material may be preferably selected from materials that have low solubility at room temperature but greater solubility at higher temperatures.

To reduce solubility, the plasticizer may be diluted either by the solvent that is removed after sintering or inert solid material that may remain in the three dimensional article after cooling.

As an example of how one may select a plasticizing solvent, chemical resistance data was acquired from Degussa's TROGAMID T5000 product literature and the Hansen solubility parameters of the solvents were estimated using the Hoy group contribution method as described in the Polymer Handbook, to produce the data given in Table 1:

TABLE 1

| Solvent | Effect | δd | δp | δh |
|---|---|---|---|---|
| allyl alcohol | dissolves | 13.5 | 12.5 | 22 |
| amyl alcohol | dissolves | 14.6 | 9.3 | 16.9 |
| Aniline | dissolves | 16.3 | 13.1 | 10.6 |
| n-butyl alcohol | dissolves | 14.4 | 10.1 | 18.5 |
| Crotonaldehyde | dissolves | 14.1 | 11.2 | 15.2 |
| dimethyl formamide | dissolves | 12.6 | 10.4 | 12.2 |
| ethylene diamine | dissolves | 13.6 | 14.5 | 18 |
| formic acid | dissolves | 13.3 | 13.1 | 26.3 |
| furfural alcohol | dissolves | 14 | 13.7 | 22.1 |
| acetic acid | dissolves | 13.9 | 10.4 | 16.6 |
| isoamyl alcohol | dissolves | 14.3 | 9.3 | 16.3 |
| n-propanol | dissolves | 14.2 | 11 | 20.9 |
| adipinnic acid | no effect | 14.8 | 10.5 | 11.9 |
| amyl acetate | no effect | 15.3 | 7.7 | 10.5 |
| Anisole | no effect | 17.1 | 10.7 | 12.4 |
| Benzene | no effect | 17.5 | 9.2 | 8.1 |
| butyl acetate | no effect | 15.2 | 8.2 | 11 |
| t-butyl methyl ether | no effect | 15.2 | 5.6 | 9.2 |
| carbon tetrachloride | no effect | 14.4 | 17.9 | 9.4 |
| dibutylphthalate | no effect | 15.3 | 9.5 | 9.5 |
| 1,2 dichlorobenzene | no effect | 18.2 | 9.9 | 6.2 |
| difluorodichloromethane | no effect | 31.1 | 18.7 | 25.3 |
| si-isobutyl ketone | no effect | 15.1 | 7.1 | 9 |
| di isopropyle ether | no effect | 15.4 | 5.2 | 9 |
| ethyl acetate | no effect | 14.7 | 9.5 | 12.9 |
| ethyl benzene | no effect | 17.5 | 7.8 | 6.3 |
| ethyl ether | no effect | 15.6 | 6 | 12 |
| formaldehyde | no effect | 12.5 | 15.5 | 31.9 |
| isooctane | no effect | 15.9 | 0 | 5.8 |
| n-heptane | no effect | 15.2 | 0 | 4.9 |
| n-hexane | no effect | 15.2 | 0 | 5.6 |
| hexane triol | no effect | 12.1 | 12.4 | 23.3 |
| Toluene | no effect | 17.4 | 8.5 | 7.2 |
| trichloroethylene | no effect | 15.4 | 16.4 | 10.4 |
| acrylonitrile | stress crack | 12.5 | 14.2 | 19.5 |
| benzaldehyde | stress crack | 15.8 | 12.9 | 11.3 |
| 1,3 butane diol | stress crack | 12.6 | 12.5 | 23.5 |
| 1,4 butane diol | stress crack | 13.1 | 13.1 | 24.9 |
| 2,3 butane diol | stress crack | 12.1 | 11.8 | 22 |
| t-butyl alcohol | stress crack | 13.8 | 10.1 | 16.7 |
| Chloroform | stress crack | 14.7 | 15.9 | 12.8 |
| 1,2 dichloroethylene | stress crack | 15 | 13.7 | 14 |
| Ethanol | stress crack | 13.8 | 12.3 | 24.5 |
| Isopropanol | stress crack | 13.8 | 11 | 20 |
| methyl ethyl ketone | stress crack | 14.6 | 9.8 | 13.6 |
| propylene glycol | stress crack | 12.4 | 14.3 | 27.3 |

Figure 5:
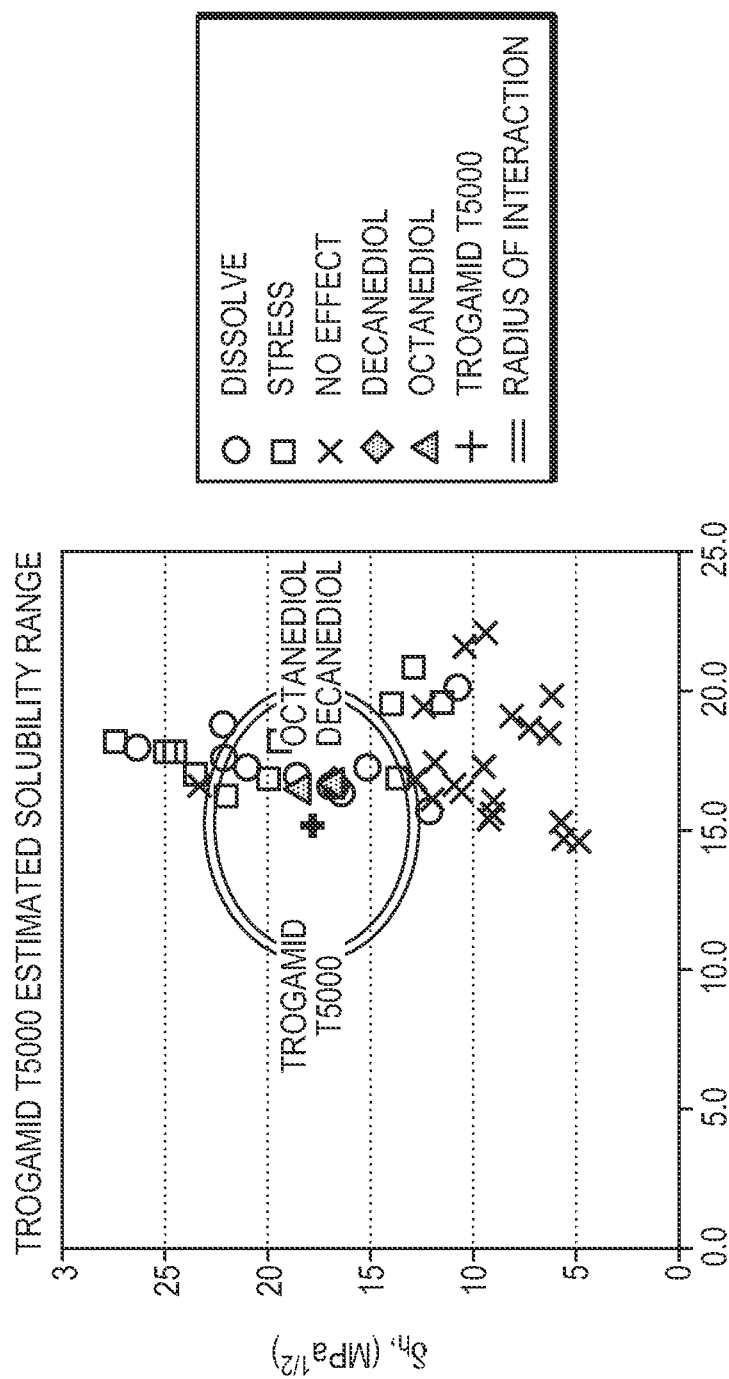
FIG. 5 is a graph illustrating an estimated solubility range of TROGAMID T-5000.

From this table, one can plot a solubility range for TROGAMID T5000 by plotting the hydrogen bonding forces, $\delta_h$, against the combined value of the dispersion and polar forces, $(\delta_d^2+\delta_p^2)^{1/2}$ solvent within a radius of 5) as shown in FIG. 5. In accordance with a heuristic, any (MPa)$^{1/2}$ of a polymer's solubility parameter location on the $\delta_h$ vs $(\delta_d^2+\delta_p^2)^{1/2}$ plot is to be considered a solvent that will interact with the polymer, and any solvent outside that radius typically does not have any effect. The solubility parameters for TROGAMID T5000 in this example may also be estimated from the Hoy contribution method. One can see in FIG. 5 that solvents that have no effect (represented by X), as indicated in the TROGAMID T5000 product literature, lie at or beyond the radius of interaction (indicated by a large oval), while solvents that affect the polymer (represented by ○ and ε, as well as octanediol and decanediol) fall within the radius with some extending upwards outside the radius as the hydrogen bonding forces increase. This suggests that solvents with high hydrogen bonding forces are more significant in polymer-solvent interaction for this particular example. When the hydroxylated hydrocarbons of interest in certain embodiment, i.e., decanediol and octanediol, are plotted using the Hoy contribution method, one can see that they fall within the radius of interaction of TROGAMID T5000, and may, therefore, impart the desired plasticizing effect.

EXAMPLES

Example 1

One kilogram of particulate material was prepared using the materials and ratios shown below in Table 2. The mixture was placed in a Kitchen Aid Professional 600 Mixer and mixed for about 20 minutes. The resulting blended mixture was then sieved through a 50 mesh screen to remove clumps.

TABLE 2

| Ingredient | Percent (weight) | Material/Trade Name | Vendor/Grade |
|---|---|---|---|
| Plaster | 52.3 | HYDROCAL | U.S. Gypsum |
| Plastic | 42.9 | TROGAMID T5000 | Degussa |
| Adhesive | 4.2 | Polyvinyl Alcohol | Cleanese |
| Accelerator | 0.2 | Potassium Sulfate | Aldrich |
| Accelerator | 0.4 | Terra Alba | U.S. Gypsum |

Flexural strength test bars 50 mm long, 5 mm wide, and 5.7 mm tall were printed on Z310 using zb58 binder with a-binder-to-volume ratio of 0.10. The test bars were dried for 2 hours at 38° C. in an oven. Sequentially, test bars were infiltrated by dipping them in different alcohols (solvents) for 15 seconds at room temperature, removing them from the solvents, and placing them in an oven (Cole Palmer StableTemp mechanically convected oven model 52100-00) preheated to 75° C. for 3 hours. After the test bars were cooled at ambient conditions for 1 hour, they were placed and supported on a 2-point span spaced at 40 mm. A force was applied on the top of the bar at the center of the 40 mm span using a Texture Analyzer TA-XT2 from Texture technologies (Scottsdale, N.Y.). The maximum force applied at which the bars break was recorded and used to calculate the measured bar strengths given in Table 3. As one can see from the table, the use of an infiltrant greatly increased the resulting bar strength.

TABLE 3

| Infiltrant | Z Corporation bar strength (MPa) |
|---|---|
| None | 1.0 |
| Ethanol | 17.0 |
| n-propanol | 17.7 |
| Methanol | 19.9 |

Example 2

Powdered material was prepared according to the procedure described in Example 1, using the materials and ratios shown below in Table 4.

TABLE 4

| Ingredient | Percent (weight) | Material/Trade Name | Vendor/Grade |
|---|---|---|---|
| Plaster | 47.2 | HYDROCAL | U.S. Gypsum |
| Plastic | 47.2 | TROGAMID T5000 | Degussa |
| Adhesive | 4.1 | Polyvinyl Alcohol | Cleanese |
| Accelerator | 1.0 | Potassium Sulfate | Aldrich |
| Accelerator | 0.5 | Terra Alba | U.S. Gypsum |

Flexural strength test bars describe in Example 1 were printed on Z310 particulate material using zb58 binder with a binder to volume ratio of 0.25. Parts were dried for 2 hours at 38° C. in an oven. Sequentially, parts were infiltrated by dipping them in different liquids for 15 seconds at room temperature. Then parts were removed from the solvent and placed in a microwave oven (Sharp Carousel model R2A57 700W). Parts were microwaved for 5 minutes at "High" settings. After parts cooled at ambient conditions for 1 hour, the flexural strengths were acquired as described in Example 1, and are reported in Table 5.

TABLE 5

| Infiltrant | Z Corporation bar strength (MPa) |
|---|---|
| None | 0.9 |
| 40% Ethanol in acetone | 20.4 |
| 15% Dipropylene glycol in isopropanol | 15.6 |

The same dry uninfiltrated flexural strength test bars were placed in a preheated bath contained 1,10-decanediol preheated to 85° C. for 10 seconds, removed and left for 16 hours in the oven at 85° C. The flexural strength test indicated a strength of 28.1 MPa.

Example 3

Powdered material was prepared according to the procedure described in the Example 1 using the materials and ratios shown below in Table 6.

TABLE 6

| Ingredient | Percent (weight) | Material/Trade Name | Vendor/Grade |
|---|---|---|---|
| Plaster | 51.8 | HYDROCAL | U.S. Gypsum |
| Plastic | 38.3 | TROGAMID T5000 | Degussa |
| Adhesive | 6.6 | Polyvinyl Alcohol | Cleanese |
| Accelerator | 2.5 | Potassium Sulfate | Aldrich |
| Accelerator | 0.8 | Terra Alba | U.S. Gypsum |

Flexural strength test bars described in Example 1 were printed on Z310 particulate material using zb58 binder with a binder to volume ratio of 0.23. Parts were dried for 2 hours at 38° C. in an oven. Parts were completely dipped in the heated bath containing molten materials for 10 seconds, removed from the molten material and placed in the oven. The flexural strength results are indicated in Table 7.

TABLE 7

| Infiltration material | Temperature ° C. | Exposure time (hr) | Z Corporation bar strength (MPa) |
|---|---|---|---|
| None | 80 | 1 | 3.3 |
| 1,10- decanediol | 80 | 1 | 19.8 |
| 17% n-butyl benzene sulfonamide in 1,10-decanediol | 70 | 1 | 20.9 |
| 1,8- octanediol | 80 | 2 | 22.6 |

Example 4

A powdered material may be prepared according to the procedure described in the Example 1 using the materials and ratios shown below in Table 8.

TABLE 8

| Ingredient | Percent (weight) | Material/Trade Name | Vendor/Grade |
|---|---|---|---|
| Plaster | 58.0 | HYDROCAL | U.S. Gypsum |
| Plastic | 20.0 | TROGAMID T5000 | Degussa |
| Plasticizer | 10.0 | Hydrocarbon diol, e.g., 1,10-Decanediol | Sigma-Aldrich |
| Adhesive | 8.0 | Polyvinyl Alcohol | Cleanese |
| Accelerator | 3.0 | Potassium Sulfate | Aldrich |
| Accelerator | 1.0 | Terra Alba | U.S. Gypsum |

Articles may be created from the particulate material formulation listed in Table 8 using zb58 aqueous fluid binder with a Z310 printer. The article may then be removed from the Z310 printer 2 hours after printing has been completed and the article placed in a mechanical convection oven set between 75° C. to 100° C. for 0.5 to 2 hours to melt the hydrocarbon diol within the article, to plasticize the plastic and facilitate sintering.

Kits

A preferred kit includes a powder adapted for three dimensional printing, an aqueous fluid for activating water soluble components of the three-dimensional printing powder, and an infiltrant suitable for plasticizing an aqueous-insoluble thermoplastic component of the particulate material. The powder may include a loose, dry, and substantially free-flowing particulate mixture including an aqueous-insoluble thermoplastic particulate material, plaster (calcium hemihydrate), water-soluble adhesive, and, optionally, a retarder, accelerator, and/or processing aids. The aqueous fluid binder may include water, a humectant, a preservative, and, optionally, a surfactant, and/or an optical brightening agent. The infiltrant may include a hydroxylated hydrocarbon, a solid wax, a plasticizer, and a stabilizer.

The particulate material is adapted for use in three dimensional printing to form an article comprising a plurality of layers, the layers including a reaction product of the particulate material and the aqueous fluid that contacts the particulate material during three dimensional printing. The aqueous fluid may be substantially clear, have a viscosity selected from a range of 1-1.35 cps, a surface tension selected from a range of 30-36 dynes/cm, and a pH selected from a range 4.9 to 10.3. The infiltrant may be adapted to plasticize the aqueous-insoluble thermoplastic particulate material by lowering the glass transition temperature of the aqueous-insoluble thermoplastic particulate to allow the sintering of those particulates. The kit may also include a combination of aqueous fluids comprising cyan, magenta, and yellow colorants.

The aqueous binder may be selected such that it is capable of hydrating the plaster (calcium hemihydrate) and initiating the precipitation into a gypsum cement. The binder is applied onto the substantially dry particulate material so as to occupy from 10% to 35% of the volume defined by the selectively printed area at a predetermined layer thickness, typically 100 microns. The printed area is then allowed to set to attain a flexural strength of at least 1 MPa, for example after 2 hours from the time the last layer was printed.

An infiltrant that is selected to plasticize the aqueous-insoluble thermoplastic particulate material is preferably clear and translucent to allow the natural lightness and color of the powder to show through. The infiltrant may also be selected so as to not interact with the selectively printed areas where aqueous fluid colorants were applied so that the colors do not migrate out of or through the article. The infiltrant may be selected to have a kinematic viscosity of 150 centiStokes or less when in a liquid state at a predetermined temperature.

Flow Properties of Build Materials

Compositions have been disclosed above that relate to the control of the flow properties of the build material in three-dimensional printers. The three principle methods flow property control are the addition of liquid "processing aids," control of grain size distribution, and the addition of solid fillers that contribute to the frictional behavior of the build material. Many candidate materials have been disclosed previously, for example, in U.S. Patent Publication Number 2005/0003189, incorporated herein by reference in its entirety. Previously, however, the exact implementation of these methods has been by trial and error. Here, some mechanical properties of dry particulate build materials are disclosed that are particularly suited for use in three dimensional printing, especially in contrast to other formulations of similar materials for other uses that may not require special flow characteristics of the raw materials.

Figure 6:
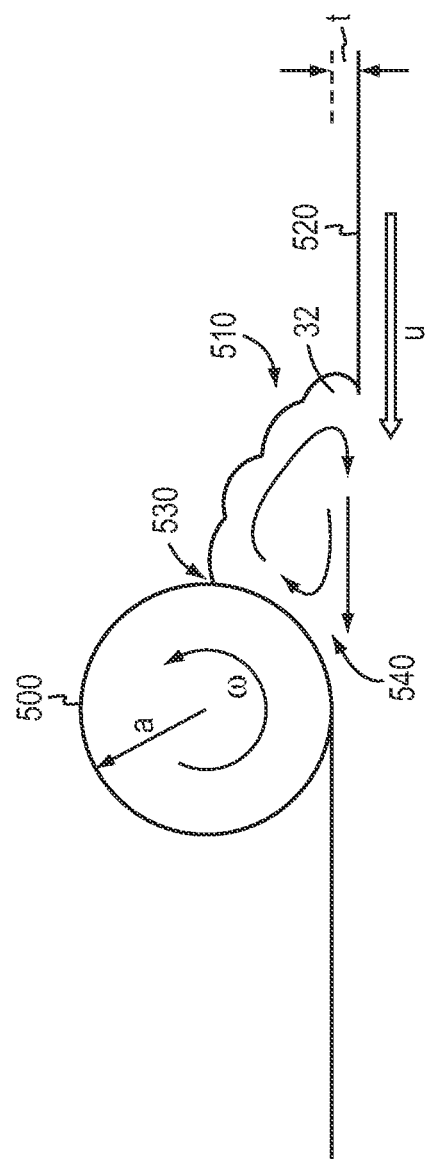
FIG. 6 is a schematic illustration of a circulating spreader bead.

Referring to FIG. 6, in an embodiment of a three-dimensional printer, dry, free-flowing particulate build material is spread by a rotating spreader rod 500. The rod rotates in a direction counter to the direction of motion of the spreading mechanism. A circulating bead 510 of build material 32 is pushed in front of a moving rod over a stationary bed. For the sake of convenience, the system is shown in the frame of the rod with a moving bed 520 and stationary bead. The bed is assumed to approach the spreader, and the bead of build material circulates around a nearly stationary center. One may assume that the build material is lifted by the leading surface of the spreader rod because it adheres to the rod surface 530. The direction of the flow of the build material reverses close to a nip 540, i.e., an interface between the spreading roller 500 and the moving bed 520.

Figure 7:
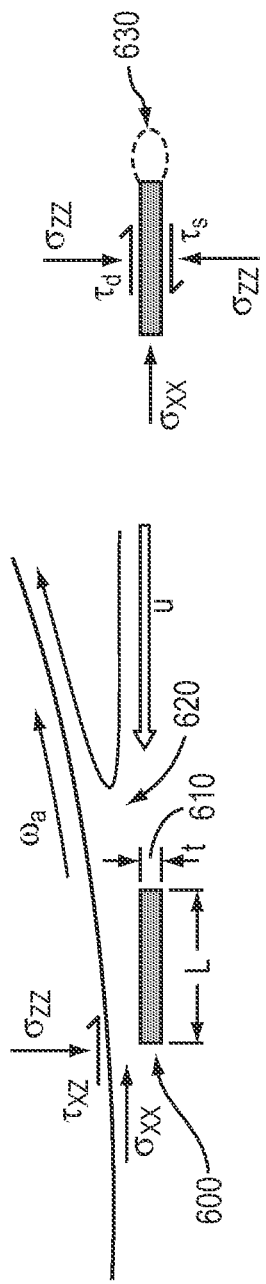
FIGS. 7a, 7b, and 8 are graphs illustrating the forces acting on a particle during three dimensional printing.

The equilibrium of a small printed feature as it passes directly underneath the spreader rod is analyzed. On typical three-dimensional printers, the thickness t of a single printed layer of build material 32 is approximately 1/100 the radius of the spreader rod. Referring to FIG. 7a, the spreader exerts a compressive stress $\sigma_{zz}$ and a shear stress $\tau_{xz}$ on the build material directly underneath it. There is also a horizontal stress component $\sigma_{xx}$.

One may assume that the horizontal stress applied to the left edge 600 of the feature is not opposed by another stress on the right edge 610. The feature is assumed to leave a wake 620 behind it where build material, after being swept along the upper surface, is unable to wrap around the downstream corner and establish a stress analogous to hydrostatic pressure against the right surface. The horizontal stress applied to the left may be opposed by a shear stress along the bottom surface. A free body diagram of the feature is shown in FIG. 7b, including a hollow cavity 630 formed in the feature wake 620.

It is assumed here that dry, free-flowing particulate build material in motion possesses a different shear strength than build material that has been allowed to rest for a time. In general, one may expect a different yield locus for build material in different states of motion. For purposes of this derivation, this is expressed here as two different sets of yield parameters, "static" and "dynamic" values of the cohesion and friction angle.

These properties of particulate materials are amply supported in the literature. See, for example, B. M. Das, Advanced Soil Mechanics, Hemisphere Pr. 1997, pp. 315-317 or S. Aranson & L. S. Tsimring in *The Physics of Granular Media*, H. Hinrichsen & D. Wolf, eds, Wiley-VCH, (2004) pp. 146-147, incorporated herein by reference in their entireties.

Figure 8:
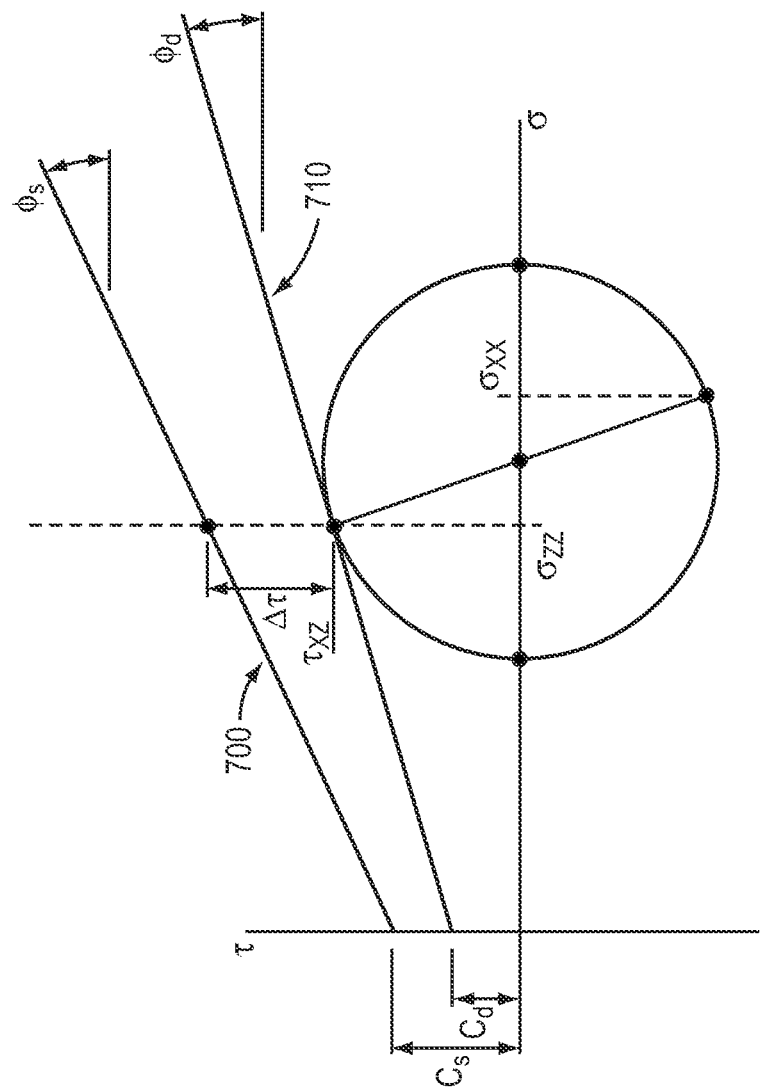

A force balance on the feature shown in FIG. 8 leads to the equation:

$$l[C_s - C_d + \sigma_{zz}(\tan \phi_s - \tan \phi_d)] = L\Delta\tau > t\sigma_{xx} \quad (1)$$

for the feature to remain in place. The normal stress against the bottom surface of the feature is assumed the same as that against the top surface. The difference in shear strength between the static values (static yield locus 700) and dynamic values (dynamic yield locus 710) with normal stress $\sigma_{zz}$ is denoted by $\Delta\tau$.

"Bredt flow parameter" (Br) is herein defined, expressing, in general, the propensity for printed features to shift in the build area of a three-dimensional printer during spreading of build material:

$$\Delta\tau/\sigma_{xx} = Br > t/L \approx 0.1 \quad (2)$$

The ratio t/L is slightly arbitrary. One may assume for practical purposes that features with a length at least several times the layer thickness (L~10 times t) are those that are preferably considered in this model. Layers with thickness of 100 μm are standard in three-dimensional printing machines that are currently available, and instability of isolated patches smaller than 1.0 mm may have a minimally discernable effect on the appearance of an article.

For the flow conditions most useful for three dimensional printing, the build material is non-cohesive, i.e., the cohesion of the particulate material is much less than the dynamic pressure of material in flow. Using reasonable values for the bulk density of the build material and spreading speed in a standard ZPrinter®310 three-dimensional printer, one obtains an order of magnitude estimate:

$$c_s \approx c_d >> \rho(u + \Omega a)^2 \approx 600 \text{ Pa} \quad (3)$$

A material having shear strength of this magnitude is a weak gel, such as yogurt. While it is not "strong" in any sense of the word, it is by no means "free-flowing." As an additional estimate of the lower bound of the cohesion, we may observe that the bead of free-flowing particulate build material may be in a state of yielding at the bottom of the pile when the counter-roller begins to move it across the build area. In a ZPrinter®310 three-dimensional printer, the bead is approximately 1 cm tall. Accordingly, we require the following inequality to hold:

$$c_s \approx c_d >> \rho g h \approx 100 \text{ Pa} \quad (4)$$

This is typically a minimum acceptable range for cohesion in a particulate build material for it to be considered "free-flowing." While the compressive and shear stress imposed on the build material through the motion of the counter-roller may have a magnitude approximately 600 Pa, the cohesion is preferably accordingly less than 100 Pa in order for it not to adversely affect the layering of build material.

With the assumption that the cohesion is negligibly small, the following simplification may be made:

$$(\tan \phi_s - \tan \phi_d) > t\sigma_{xx}/L\sigma_{zz} \quad (5)$$

and $$\frac{\sigma_{xx}}{\sigma_{zz}} = \frac{(1+\sin\phi_d)}{(1-\sin\phi_d)} \quad (6)$$

This leads to the equation:

$$(\tan\phi_s - \tan\phi_d)\frac{(1-\sin\phi_d)}{(1+\sin\phi_d)} = Br_{nc} > 0.1 \quad (7)$$

Equation 7 expresses a vitally important feature of free-flowing particulate build materials that are suitable for use in three-dimensional printing machines. The quantity on the left, $Br_{nc}$, is termed the "Bredt flow parameter for noncohesive particulate materials," and it preferably has a value greater than about $1/10$ for small printed features to remain stationary during spreading.

Measurement of Static and Dynamic Friction Coefficients

Methods exist for measuring the static yield properties of particulate materials in shear. See, for example, B. M. Das, *Advanced Soil Mechanics*, Hemisphere Pr. 1997, pp 313-326. It is found, however, that the values for the yield parameters $\phi$ and c vary with experimental conditions, and it is preferable to measure the properties in a particular stress range of interest.

An example of a piece of laboratory equipment that is capable of measuring the static friction characteristics of particulate materials is the "ShearScan TS12" manufactured by Sci-Tec Inc. This device holds a sample of material in a cylindrical cell and applies a vertical load to the material to consolidate it to a specified level. The device then applies a gradually increasing transverse shearing force until it detects slip in the sample of material. It performs this measurement across a range of applied loads to develop a yield locus analogous to those pictured in FIG. 8. Since the instrument measures the shear stress at the instant of rupture, this is the "static" friction in the particulate material.

An approximate laboratory procedure may provide estimates of the flow parameter for non-cohesive particulate build materials. This may be done by measuring the angle of repose of a pile of a particulate material under static and dynamic conditions. The procedure is executed as follows. On an unpolished type 304 stainless steel sheet with a 2B mill finish and a dimension of 12 inches square by 0.060 inches in thickness available from McMaster-Carr based in Elmhurst, Ill., a conical pile is formed from a particulate material sample by sprinkling particles very slowly at a bulk volumetric flow rate of 30±15 mL per minute over one point using a 385 mL stainless steel funnel available from Lab Safety Supply in Janesville, Wis. from a height of about 1 cm above the growing top of the pile. The height of the pile is chosen such that $$gh \approx (u+\omega a)^2$$

This ensures that the stress at the bottom of the heap is in approximately the appropriate range. For ordinary three-dimensional printers manufactured by Z Corporation, this height is roughly 2 inches.

The initial diameter, d, and height, h, of the pile are measured. The ratio 2 h/d is an approximate measure of the static friction coefficient tan $\phi_s$. Next, a small impact force delivered from an 18-8 stainless steel slotted spring pin, ½ inch in diameter and 2.25 inches long with a mass of 32.0±0.5 grams available from McMaster-Carr dropped onto the edge of the stainless steel sheet from a height of 0.65±0.02 inches so the pile collapses. It is typically preferable to deliver to the plate a relatively light impact so that the motion of the pile after the impact is primarily driven by gravity and not by kinetic energy. Two impacts may be sufficient. The final height and diameter of the collapsed pile are measured, and the ratio 2 h/d is an approximate measure of the dynamic friction coefficient tan $\phi_d$.

Several particulate samples were measured in this manner, and the data are presented below in Table 9. The calculated flow parameter is the "noncohesive" form given in equation 7.

TABLE 9

Measurements of flow parameter for various candidate particulate build materials

| Particulate sample | tan phi s | tan phi d | $Br_{nc}$ |
|---|---|---|---|
| zp100 | 0.83 | 0.52 | 0.11 |
| zp100 | 0.91 | 0.45 | 0.19 |
| zp100 | 1.00 | 0.65 | 0.10 |
| zp130 | 0.65 | 0.35 | 0.15 |
| zp130 | 0.74 | 0.40 | 0.16 |
| zp130 | 0.79 | 0.45 | 0.14 |
| 4F Lucite | 0.53 | 0.28 | 0.14 |
| 50 μm Al$_2$O$_3$ | 0.64 | 0.44 | 0.09 |
| Coated glass beads | 0.45 | 0.35 | 0.05 |
| +10 ppm Neobee M20 | 0.46 | 0.32 | 0.07 |
| +20 ppm Neobee M20 | 0.52 | 0.33 | 0.10 |
| +30 ppm Neobee M20 | 0.67 | 0.53 | 0.05 |
| +40 ppm Neobee M20 | 0.79 | 0.69 | 0.03 |
| +50 ppm Neobee M20 | 0.78 | 0.76 | 0.00 | zp100 and zp130 are products marketed by Z Corporation for building appearance models.
4F Lucite from Ineos Acrylics has a particle size between 55 μm and 70 μm.
Tabular 50 μm Al$_2$O$_3$ acquired from KC Industries
Glass Beads from Potter's Industries, 72 μm grain size, aminosilane surface treatment
Neobee M20 was used to coat glass beads. Neobee M20 from Stepan Industries As these data approximately show, build materials designed by Z Corporation for three dimensional printing all fall in the same range, a little bit higher than the required lower bound. Some scatter in the results is to be expected with this approximate technique. Although the static angle of repose of zp100 is higher than in zp130, the flow parameter for the two build materials is nearly the same. In fact, qualitative experience shows that these two products perform about the same.

Of the other three materials tested, glass spheres alone had the poorest performance, with a flow parameter of only about 0.05. This, too, is supported by qualitative experience: glass beads alone are unsuitable for three dimensional printing from the standpoint of spreading. However, glass beads may be mixed with various processing aids and with other particulate materials that may be finer or equal to in particle size having a non-spherical and irregular particle shape to achieve a desirable Bredt parameter greater than 0.10, thereby being suitable for use in three dimensional printing.

To illustrate the extreme sensitivity of particulate behavior with even small additions of certain chemicals, generally referred to as "processing aids," a series of data were taken in which tiny (10 ppm) increments of a low-viscosity emulsifier are added to a sample of glass spheres. The flow parameter rises quickly, peaks, and falls away even more quickly even though both the static and dynamic friction angles increase through the series. The critical point occurs when the dynamic angle of repose transitions from a nearly constant value to a linearly increasing value. This shows that there can be rather sharp optima in composition to obtain useful spreading characteristics.

This test is a fairly useful technique for identifying relative performance properties between different candidate materials. The preferred method for evaluating flow properties of candidate build materials during formal optimization after the initial selection period is to test samples of the material on a working three-dimensional printer. Certain pathological geometries are known to those experienced in the art, and they can be evaluated either qualitatively or quantitatively. One particularly useful geometry for observing stability during spreading is a flat plate studded with pegs that are oriented downward during the build. During printing, the earliest layers addressed are a series of disconnected patches that are relatively free to shift in the build material. After these have been formed, a plate is printed that joins all of the pegs together in a single object. One can easily examine whether the pegs are uniform and straight, and one can evaluate the quality of spreading on that basis.

Additional Flow Properties of Build Materials

Compositions have been disclosed that relate to control of the flow properties of the build material in three-dimensional printers. The three principal methods are the addition of liquid "processing aids," control of grain size distribution, and the addition of solid fillers that contribute to the frictional behavior of the build material. Many candidate materials have been disclosed previously, for example, in U.S. Patent Publication Number 2005/0003189. Some mechanical properties of dry particulate build materials are disclosed in the following discussion that are particularly suited for use in three dimensional printing, especially in contrast to other formulations of similar materials for other uses that do not require special flow characteristics of the raw materials.

A method that may be used to quantify a particulate material's suitability for three dimensional printing includes placing 1 liter in bulk volume of a particulate material in a metal cylinder with an inside dimension of 6.1 inches, and inside height of 6.2 inches so that the height of the powder is between 2.5 to 3.0 inches when the cylinder is capped with a translucent cover and laid on its side (i.e., the height of the cylinder is horizontal). The drum is then slowly rolled with a rotational velocity of 2.5 rotations/min±0.5 rotations/min until the powder reaches an angle where it avalanches upon itself. The distance that the drum rolled, s, is recorded and the angle, $\phi$, can be determined from equation 8:

$$\phi = \frac{s}{r} \cdot \frac{180}{\pi} \qquad (8)$$

where r would equal the outside radius of the drum. The angle, $\theta$, is the internal angle of friction that particulate material has under these particular test conditions at a room temperature between 65 to 75° F. Various particulate materials known to have good and bad spreading characteristics are compared using this test method, and desirable range of internal angles of friction were determined. Table 10 summarizes the particulate material compositions that were measured.

TABLE 10

| Ingredient | Powder composition | | | | | | | |
|---|---|---|---|---|---|---|---|---|
| | A | B | C | D | E | F | G | H |
| Potter's Spheriglass 2530 CP03 | 84.64% | | 79.72% | | | 100% | 99.8% | |
| Zinc Oxide Pigment | | | 4.75% | | | | | |
| Lucite Elvacite 2014 | 15.00% | | 15.19% | | | | | |
| Mineral Oil | 0.19% | | 0.18% | | | | 0.2% | |
| Cobalt Octoate, 65% in Mineral Spirits | 0.17% | | 0.16% | | | | | |
| Z Corporation zp131 | | 100% | | | | | | |
| Z Corporation zp102 | | | | 100% | | | | |
| Z Corporation zp100 | | | | | 100% | | | |
| Z Corporation zp130 | | | | | | | | 100% |
| Internal Angle of Friction, 95% Confidence Interval | 77° ± 3° | 52.6° ± 4.9° | 36° ± 3° | 53° ± 12° | 59° ± 13° | 32° ± 3° | 81° ± 9° | 48° ± 5° |
| Three Dimensional Printing suitability | Too Cohesive | Good | Too Flowable | Good | Good | Too Flowable | Too Cohesive | Good |

Based on the results indicated in Table 10, one can conclude that powders that have an internal angle of friction greater than 40° and less than 70° are suitable for three dimensional printing in systems that use layers on the order of 125 μm.

Figure 9A:
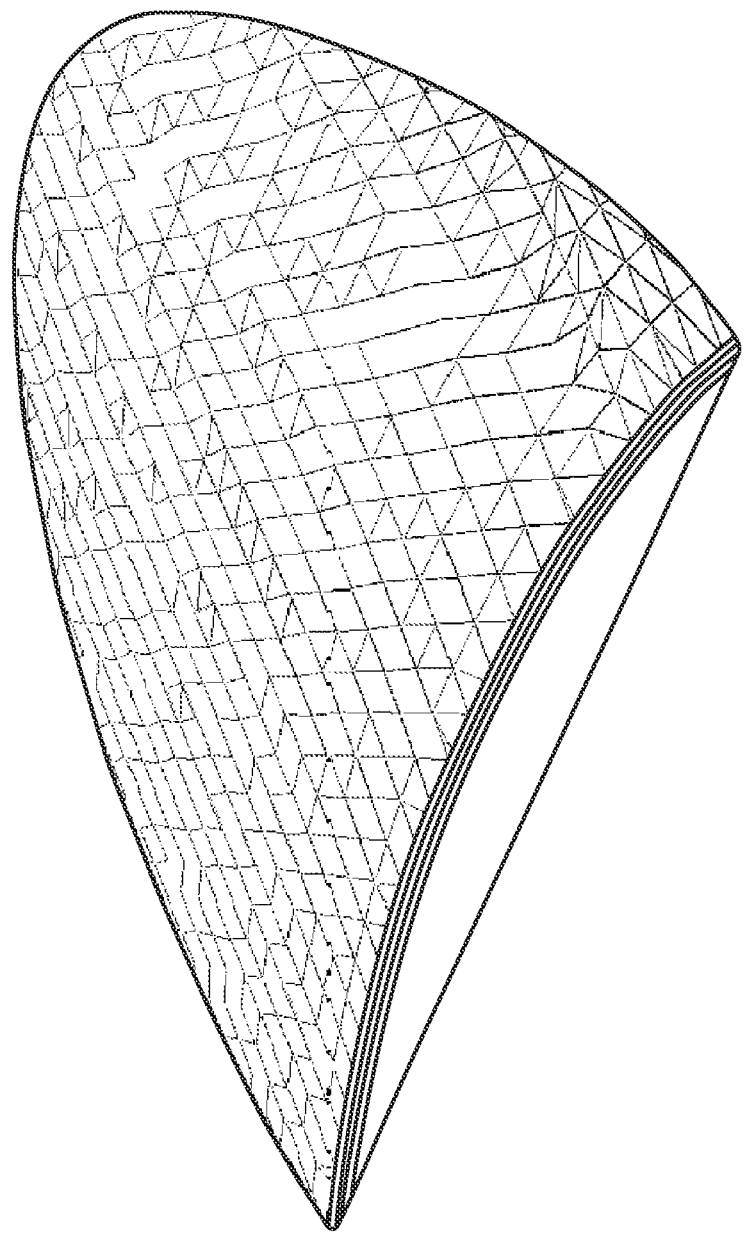
FIG. 9a is a CAD drawing of the article portion printed in FIGS. 9b and 9c.
Figure 9B:
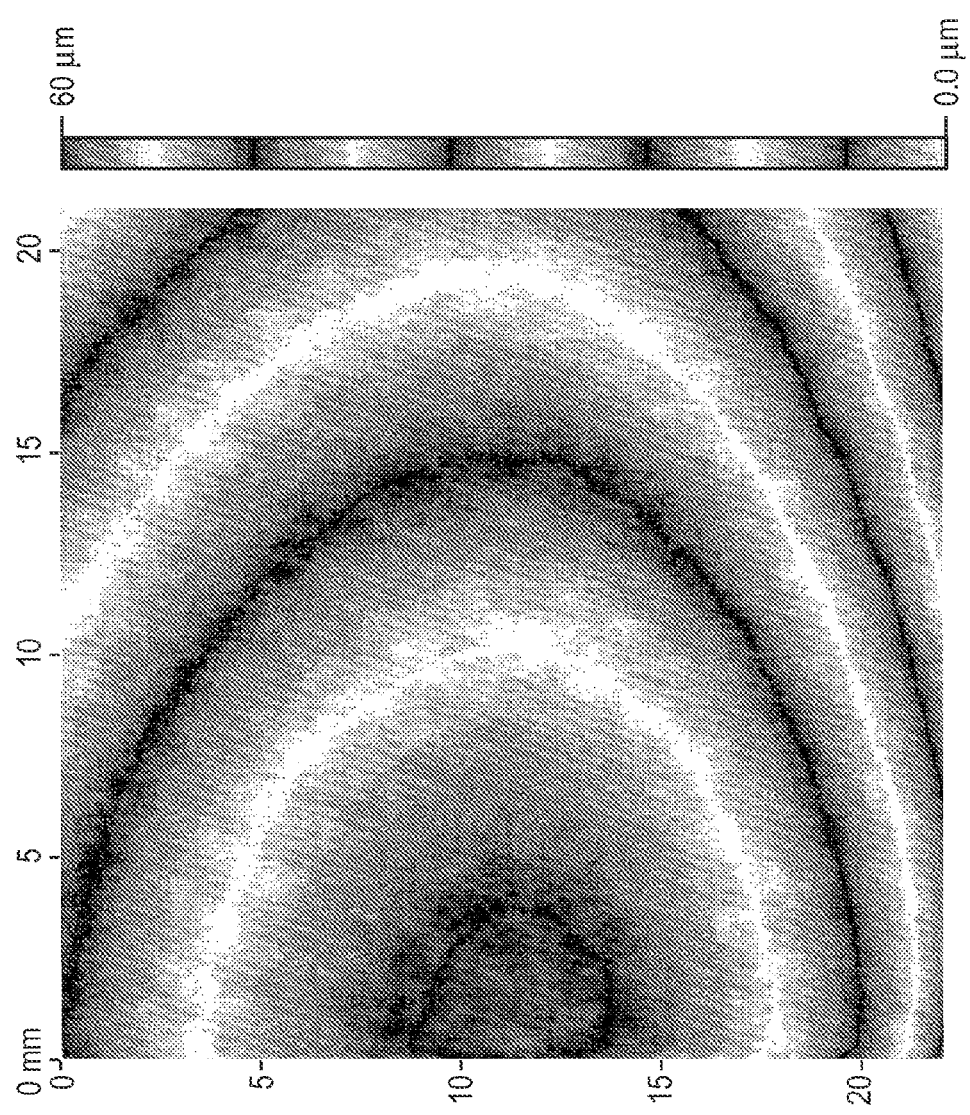
FIGS. 9b and 9c are laser profilometer images comparing the effect of particulate materials with high internal angle of friction on finished article properties.
Figure 9C:
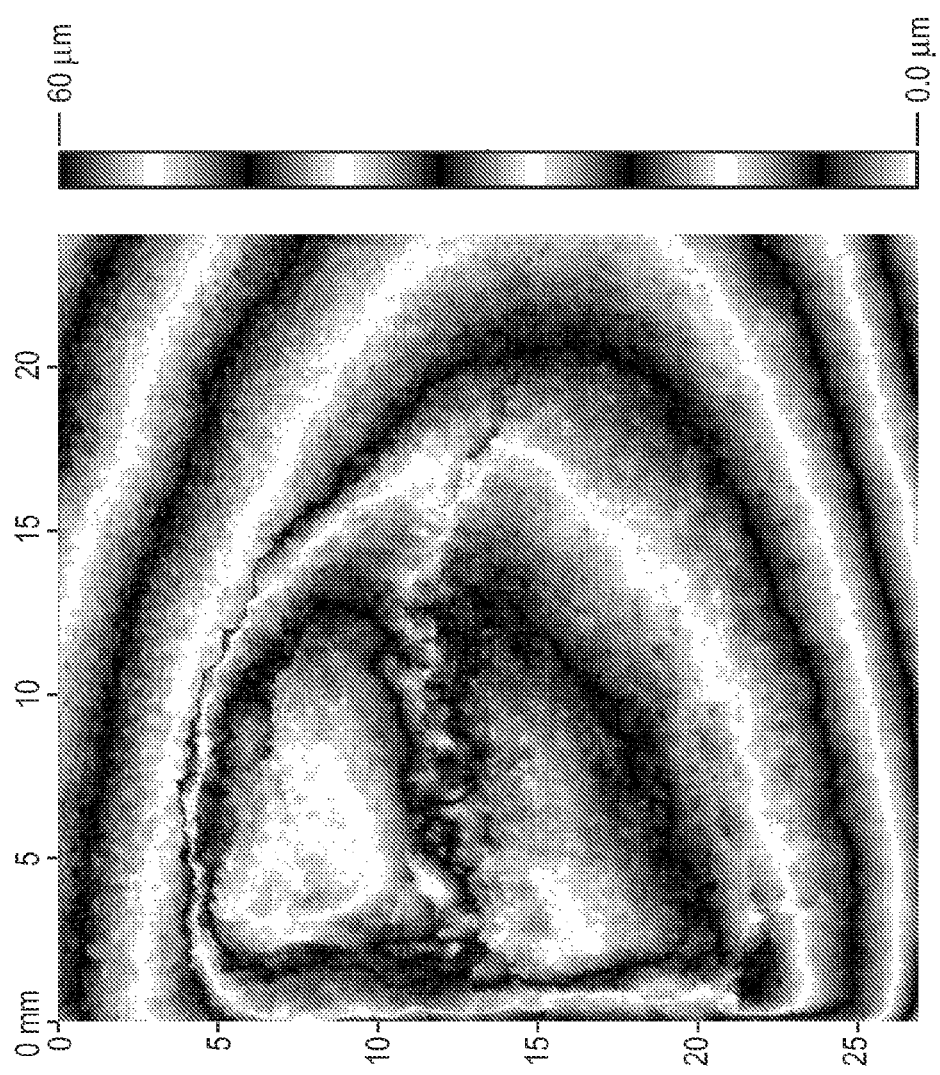

FIG. 9a is an exemplary CAD drawing of a test geometry that exhibits the distortion caused by the dragging of an article in a powder that is too flowable. FIGS. 9b and 9c are surface finish scans from a VIKING laser profilometer from Solarius. The figures show a 3D topographical representation of articles formed by three dimensional printing. In FIG. 9b, a scan of an article made with zp131 from Z Corporation exhibits smooth, even contours that closely follow the intended CAD data. FIG. 9c is a scan of a typically "too flowable" powder with an internal friction angle <40°; the powder is too flowable and unable to resist the spreading forces causing previously printed layers to be displaced, resulting in an article that has a rough and uneven surface finish, or even has displaced artifacts missing from the surface of the article. The arrow in FIG. 9c shows where geometry has shifted during printing.

Figure 10A:
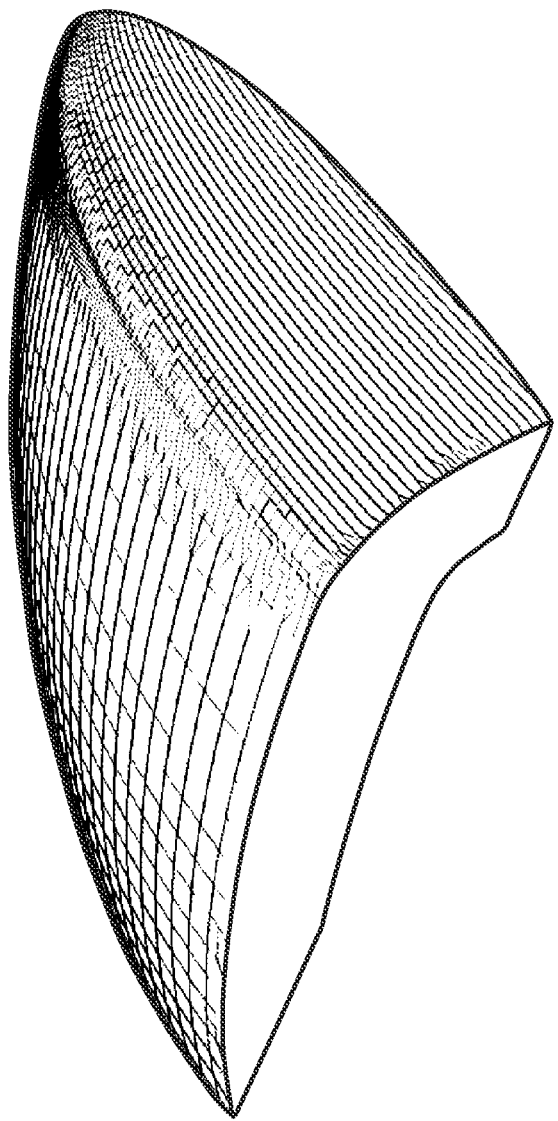
FIG. 10a is a CAD drawing of the article portion printed in FIGS. 10b and 10c.
Figure 10B:
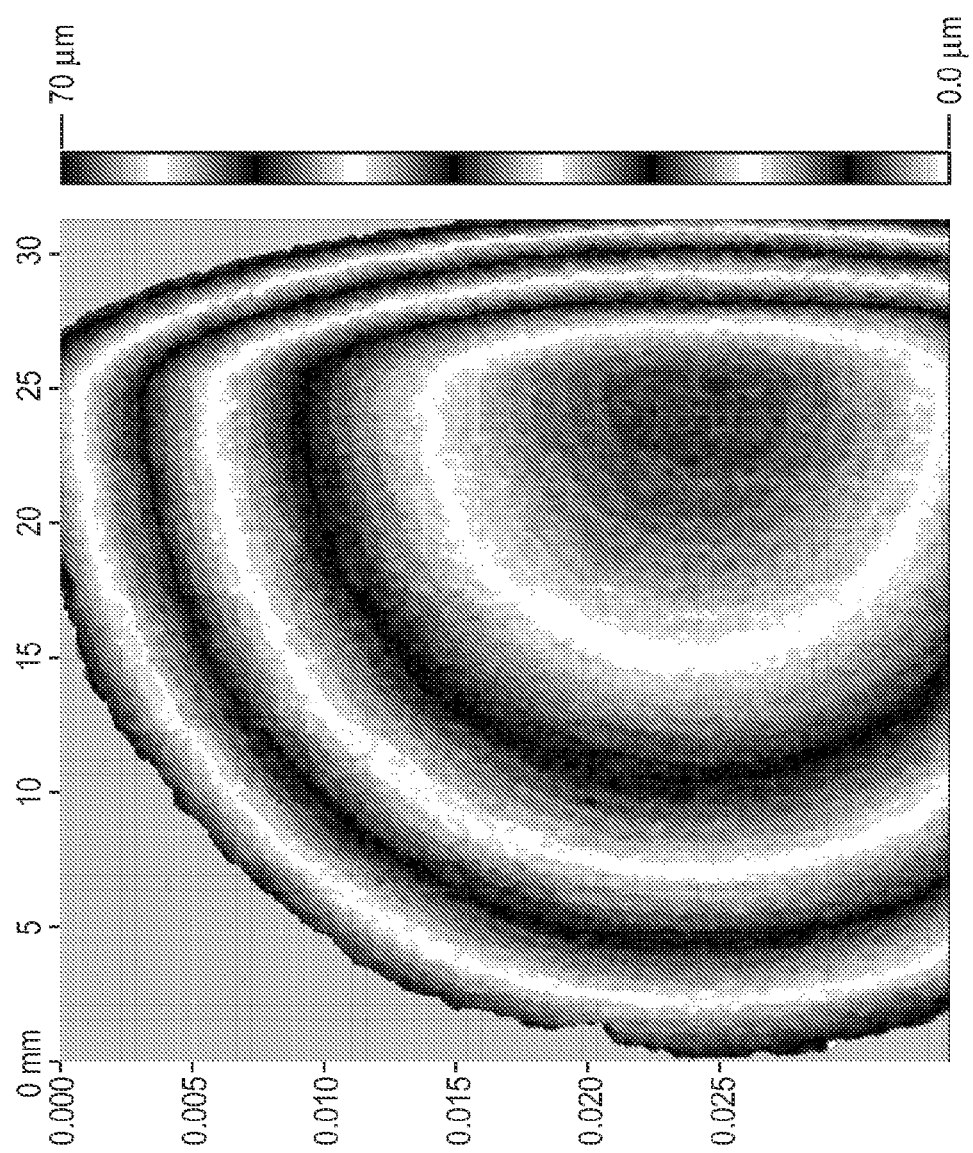
FIGS. 10b and 10c are laser profilometer images comparing the effect of particulate material with low internal angle of friction on finished article properties.
Figure 10C:
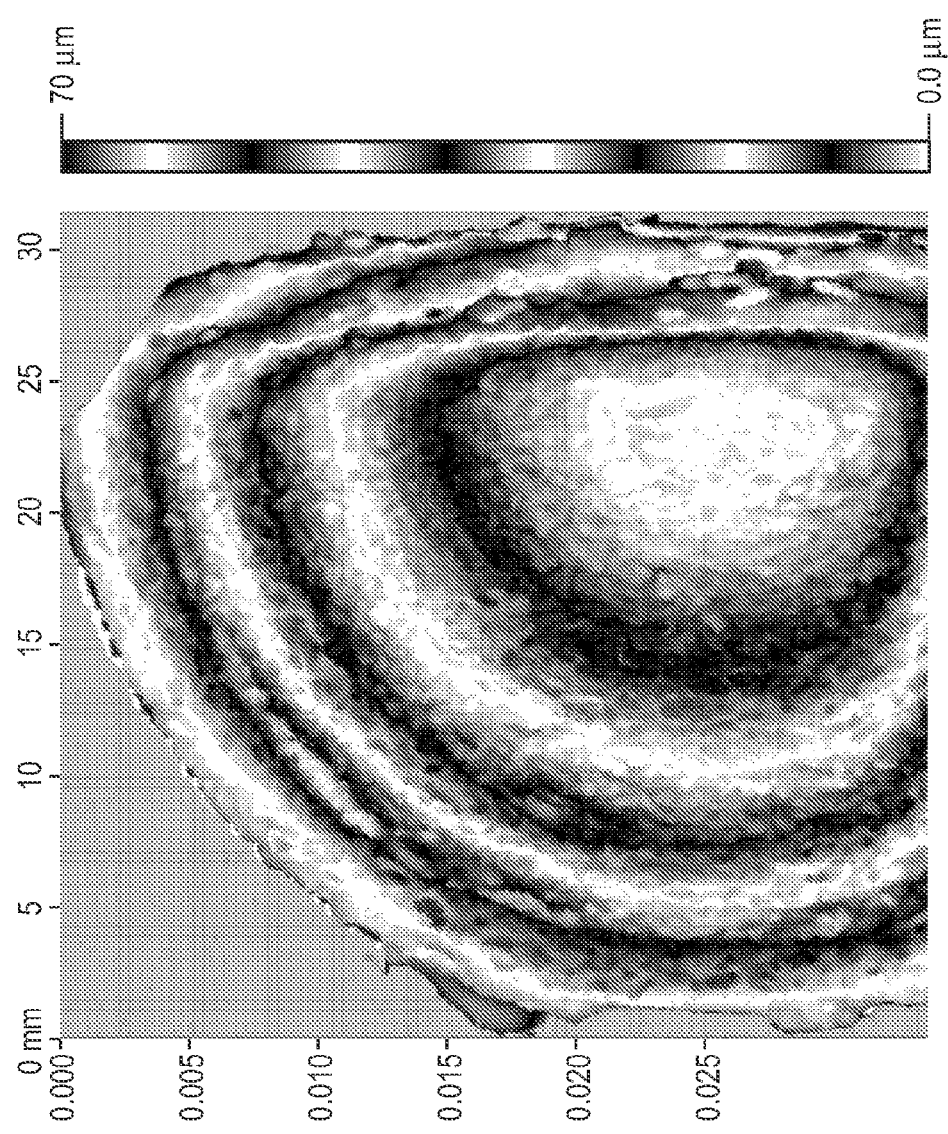

FIG. 10a is a CAD drawing of the formed article illustrated in FIGS. 10b and 10c. Referring to FIG. 10b, as one may expect, a particulate material with an internal angle of friction that is between 40° and 70°, e.g., zp131, provides a smoother finish than a particulate material with an internal angle of friction greater than 70° (FIG. 10c) where the powder is too cohesive to spread an even layer of particulate material, resulting in an article that has a rough and uneven surface finish.

This test, i.e., determination of an internal angle of friction, is a useful technique for identifying relative performance properties between different candidate materials. The preferred method for evaluating flow properties of candidate build materials during formal optimization after initial selection is to test samples of the material on a working three-dimensional printer. Certain pathological geometries are known to those experienced in the art, and they can be evaluated either qualitatively or quantitatively. One particularly useful article for observing stability during spreading is a flat plate studded with pegs that are oriented downward during the build. During printing, the earliest layers addressed are a series of disconnected patches that are relatively free to shift in the build material. After these have been formed, a plate is printed that joins all of the pegs together in a single object. One can easily examine whether the pegs are uniform and straight, and one can evaluate the quality of spreading on that basis.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method for forming a final article by three dimensional printing, the method comprising the steps of:
   providing a particulate material comprising a plurality of adjacent particles, the particulate material comprising an aqueous-insoluble thermoplastic;
   applying to at least some of the plurality of particles an aqueous fluid binder in an amount sufficient to bond those particles together to define an intermediate article; and
   thereafter, performing a post-processing treatment comprising immersing the intermediate article in a liquid infiltrant medium comprising a plasticizer to define the final article, wherein a composition of the liquid infiltrant medium is different from a composition of the aqueous fluid binder and wherein the liquid infiltrant medium comprises 0-99.99% by weight hydroxylated hydrocarbon, 0-99.99% by weight a solid wax, no more than 99.99% by weight a plasticizer, and 0.01-5% by weight a stabilizer.

2. The method of claim 1, wherein the hydroxylated hydrocarbon comprises a hydrocarbon diol with a molecular weight greater than 118 g/mol, a melting point greater than 30° C., and a kinematic viscosity of less than or equal to 150 centiStokes at a temperature of at least 50° C.

3. The method of claim 2, wherein the hydrocarbon diol comprises octane diol.

4. The method of claim 2, wherein the hydrocarbon diol comprises decane diol.

5. The method of claim 1 wherein the liquid infiltrant medium comprises 69.99-99.99% by weight hydroxylated hydrocarbon, no more than 30% by weight a plasticizer, and 0.01-5% by weight a stabilizer.

6. The method of claim 1 wherein the liquid infiltrant medium comprises 79.99-99.99% by weight solid wax, no more than 20% by weight a plasticizer, and 0.01-5% by weight a stabilizer.

7. The method of claim 1, wherein the hydroxylated hydrocarbon comprises an alcohol having a boiling point selected from a range of 25° C. to 100° C., and the plasticizer has a boiling point selected from a range of 25° C. to 100° C.

8. The method of claim 7, wherein the alcohol comprises isopropanol.

9. The method of claim 7, wherein the plasticizer comprises ethanol.

10. A method for forming a final article by three dimensional printing, the method comprising the steps of:
    providing a particulate material comprising a plurality of adjacent particles, the particulate material comprising an aqueous-insoluble thermoplastic;
    applying to at least some of the plurality of particles an aqueous fluid binder in an amount sufficient to bond those particles together to define an intermediate article; and
    thereafter, performing a post-processing treatment comprising immersing the intermediate article in a liquid infiltrant medium comprising a plasticizer to define the final article, wherein a composition of the liquid infiltrant medium is different from a composition of the aqueous fluid binder and wherein the liquid infiltrant medium comprises 30-100% by weight fugitive hydroxylated hydrocarbon, 0-50% by weight a solvent, and no more than 30% by weight a plasticizer.

11. A method for forming an article by three dimensional printing, the method comprising the steps of:
    providing a particulate material comprising a plurality of adjacent particles, the particulate material comprising an aqueous-insoluble thermoplastic;
    applying to at least some of the plurality of particles an aqueous fluid binder in an amount sufficient to bond those particles together to define the article; and
    immersing the article in a liquid infiltrant medium,
    wherein the particulate material comprises (i) an aqueous-insoluble thermoplastic particulate material selected from the group consisting of a polyamide 6-3 and therephthalic acid copolymer, cyclic polyolefins, and combinations thereof, (ii) plaster, and (iii) a water-soluble adhesive.

12. A method for forming a final article by three dimensional printing, the method comprising the steps of:
    providing a particulate material comprising a plurality of adjacent particles, the particulate material comprising an aqueous-insoluble thermoplastic;
    applying to at least some of the plurality of particles an aqueous fluid binder in an amount sufficient to bond those particles together to define an intermediate article; and
    thereafter, performing a post-processing treatment comprising immersing the intermediate article in a liquid infiltrant medium comprising a plasticizer to define the final article, wherein a composition of the liquid infiltrant medium is different from a composition of the aqueous fluid binder and wherein the liquid infiltrant medium comprises hydroxylated hydrocarbon including (i) a hydrocarbon diol with a molecular weight greater than 118 g/mol and a melting point greater than 30° C. and (ii) a plasticizer.

13. The method of claim 12, wherein the hydroxylated hydrocarbon comprises decane diol.

14. The method of claim 12, wherein the plasticizer comprises benzene sulfonamide.

15. The method of claim 12, wherein the plasticizer comprises propylene carbonate.

\* \* \* \* \*